United States Patent
Kazmi et al.

(10) Patent No.: US 11,968,134 B2
(45) Date of Patent: Apr. 23, 2024

(54) MULTIPLE CELL ACTIVATION

(71) Applicant: Telefonaktiebolaget LM Ericsson (publ), Stockholm (SE)

(72) Inventors: Muhammad Kazmi, Sundbyberg (SE); Robert Karlsson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 700 days.

(21) Appl. No.: 17/267,528

(22) PCT Filed: Aug. 9, 2019

(86) PCT No.: PCT/EP2019/071504
§ 371 (c)(1),
(2) Date: Feb. 10, 2021

(87) PCT Pub. No.: WO2020/030813
PCT Pub. Date: Feb. 13, 2020

(65) Prior Publication Data
US 2021/0242987 A1 Aug. 5, 2021

Related U.S. Application Data

(60) Provisional application No. 62/717,367, filed on Aug. 10, 2018.

(51) Int. Cl.
*H04L 5/00* (2006.01)
(52) U.S. Cl.
CPC .......... *H04L 5/0032* (2013.01); *H04L 5/0048* (2013.01)
(58) Field of Classification Search
CPC ............................. H04L 5/0048; H04L 5/0032
USPC ........................................................ 370/329
See application file for complete search history.

(56) References Cited

U.S. PATENT DOCUMENTS

2016/0277172 A1  9/2016 Yu et al.

FOREIGN PATENT DOCUMENTS

| CN | 104769867 A | 7/2015 |
|---|---|---|
| CN | 107534538 A | 1/2018 |
| CN | 107925547 A | 4/2018 |
| EP | 3338392 A1 | 6/2018 |

(Continued)

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 15)," 3GPP TS 36.133 V15.3.0, Jun. 2018, 1-3128.

(Continued)

*Primary Examiner* — Angel T Brockman
(74) *Attorney, Agent, or Firm* — Murphy, Bilak & Homiller, PLLC

(57) ABSTRACT

A method, in a wireless device that supports carrier aggregation (CA), the method comprising: receiving a configuration message, from a wireless network node, indicating that the wireless device is to directly activate two or more secondary cells. The method further comprises determining that at least a first one of the two or more secondary cells is to be activated by a first time and that at least a second one of the two or more secondary cells is to be activated by a second time, following the first time. The method also comprises activating the first one of the secondary cells by the first time and subsequently activating the second one of the secondary cells by the second time.

19 Claims, 19 Drawing Sheets

(56) References Cited

FOREIGN PATENT DOCUMENTS

| WO | 2016149167 A1 | 9/2016 |
| WO | 2017030478 A1 | 2/2017 |

OTHER PUBLICATIONS

Ericsson, "Analysis of Requirements for SCell Direct Activation at SCell Configuration", 3GPP TSG RAN WG4 Meeting #88, R4-18xxx, Gothenburg, Sweden, Aug. 20-24, 2018, 1-6.

Ericsson, "Analysis of Requirements for SCell Direct Activation at SCell Configuration", 3GPP, TSG RAN WG4 Meeting #88, R4-1810786, Gothenburg, Sweden, Aug. 20-24, 2018, 1-6.

Ericsson, "Requirements for Direct SCell Activation at RRC Reconfiguration", 3GPP TSG-RAN4, Meeting #88, R4-1810787, Gothenburg, Sweden, Aug. 20-24, 2018, 1-5.

Nokia, et al., "Direct activation of configured Scells", 3GPP TSG-RAN WG4 #85, R4-1713144, Reno, Nevada, USA, 27 Nov.-Dec. 1, 2017, 1-6.

Nokia, et al., "Revised WID on Enhancing CA Utilization", 3GPP TSG RAN meeting #79, RP-180561, Chennai, India, Mar. 19-22, 2018, 1-4.

Qualcomm Incorporated, "Discussion on open issues in direct Scell activation", 3GPP TSG-RAN WG4 Meeting #87, R4-1806868, Busan, South Korea, May 21-25, 2018, 1-5.

MULTIPLE CELL ACTIVATION

TECHNICAL FIELD

The present invention relates to techniques for multiple cell activation within wireless communication networks.

BACKGROUND

Wireless network technologies developed within the 3$^{rd}$-Generation Partnership Project (3GPP) may support a feature called carrier aggregation (CA), whereby a user equipment (UE) is able to receive and/or transmit data to and from more than one serving cell. In other words, a CA-capable UE can be configured to operate with more than one serving cell, at the same time. The term "user equipment" or "UE" may refer to any wireless communication device (e.g., a mobile terminal such as a smartphone or computing device) that is capable of communicating with 3GPP-standard-compliant network equipment, such as a radio network node.

The concept of carrier aggregation is illustrated in FIG. 1, where five component carriers are illustrated, each having a 20 MHz bandwidth. Each component carrier is associated with a respective cell. In the example shown in FIG. 1, the total bandwidth available to a UE served by the five cells is the sum of the bandwidths of those serving cells, i.e. 100 MHz. The carrier of each serving cell may be referred to as a component carrier (CC). The component carrier (CC) refers to an individual carrier in a multi-carrier system. Carrier aggregation (CA) may also be referred to with such terms as "multi-carrier system", "multi-cell operation", "multi-carrier operation", or "multi-carrier transmission and/or reception". This means the CA can be used for transmission of signalling and data in the uplink and/or downlink directions. One of the CCs is designated as the primary component carrier (PCC) or simply primary carrier or even anchor carrier. The remaining CCs are designated as secondary component carriers (SCCs) or alternatively secondary carriers or supplementary carriers. The serving cell for the primary component carrier may be called a primary cell (PCell) or interchangeably a primary serving cell (PSC). Similarly, the serving cells for the secondary component carriers may be called secondary cells (SCells) or interchangeably secondary serving cells (SSCs).

In another multicarrier operation called dual connectivity (DC), the UE is configured with a Master Cell Group (MCG) and a Secondary Cell Group (SCG). A Cell Group (CG) is a group of serving cells associated with either a master eNB (MeNB) or secondary eNB (SeNB). A Master Cell Group (MCG) is a group of serving cells associated with the MeNB, comprising a PCell and optionally one or more SCells. A Secondary Cell Group (SCG) is a group of serving cells associated with the SeNB and comprising a PSCell (Primary Scell) and optionally one or more SCells.

Multi-Carrier Secondary Cell Setup or Release Procedure

Multi-carrier secondary cell (SCell) setup or release refers to a procedure which enables a network node to at least temporarily setup or release the use of an SCell, in downlink (DL) and/or uplink (UL) by the CA capable UE. The SCell setup or release procedure can include any one or more of the following operations:

Configuration of SCell(s), also referred to as SCell addition;
De-configuration of SCell(s), also referred to as SCell release;
Activation of SCell(s);
Deactivation of SCell(s);
Configuration of PSCell(s), also referred to as PSCell addition in the context of DC;
De-configuration of PSCell(s), also referred to as PSCell release in the context of DC.

A serving radio network node performs the SCell setup or release procedure to setup or release an SCell by sending an SCell setup or release message to the UE via the PCell. Examples of such messages are the MAC control element (MAC-CE) command, RRC reconfiguration message, PSCell add/release RRC message etc.

The configuration and de-configuration procedure (i.e., addition/release of an SCell respectively) is used by the serving radio network node (e.g., eNode B in LTE) to configure a CA-capable UE with one or more SCells (DL SCell, UL SCell or both). Likewise, the de-configuration procedure is used by the radio network node to de-configure or remove one or more already configured SCells (DL SCell, UL SCell or both). In LTE networks, the configuration and de-configuration are done by the eNode B using RRC signaling.

In the context of DC, the configuration and deconfiguration procedure (i.e. addition/release of PSCell respectively) is used by the serving radio network node (e.g., MeNode B in LTE) to configure or add a DC-capable UE with PSCell in SCG. Likewise, the de-configuration or release procedure is used by the radio network node to de-configure or release or remove or change an already configured PSCell. In LTE networks, the configuration and de-configuration are done by the MeNode B using RRC signaling.

The serving radio network node (e.g., eNode B in LTE) can activate one or more deactivated SCells or deactivate one or more activated SCells on the corresponding configured secondary carriers. In general, the PCell remains activated. The activation or deactivation can be done by sending a MAC-CE command or message to the UE via the main serving cell e.g. PCell. In legacy multicarrier operation, the configured SCells are initially deactivated upon addition and also after a cell change, e.g., handover. In LTE networks, the activation and deactivation commands are sent by the eNodeB via MAC-CE messages. In the SCell activated state, the UE monitors down link channels (e.g., PDSCH or PDCCH) for that SCell; transmits any configured or scheduled uplink signals (e.g., SRS, PUCCH, PUSCH, RACH, etc.) in case the SCell also consists of uplink; reports channel state information (CSI) for the SCell on PCell and/or on the UL SCell etc. In the SCell deactivated state, the UE does not perform any of the above actions.

In standardization efforts directed to "Enhancing CA Utilization," an SCell state called dormant SCell state has been introduced. The new state is similar to the SCell activated state except that the UE under dormant SCell state is not required to monitor PDSCH or PDCCH for this SCell and does not transmit in the uplink (e.g., does not transmit SRS, PUCCH, PUSCH, RACH, etc.). But, the UE reports channel quality information (CQI) for an SCell in dormant SCell state with some configurable periodicity, e.g., according to the CQI configuration parameters defined for this state, e.g., cqi-pmi-ConfigIndexDormant, ri-ConfigIndexDormant, csi-SubframePatternDormant and cqi-FormatIndicatorDormant. The purpose of this state is to save UE power while enabling the UE to more quickly move from the dormant to the activated state, since the UE is already reporting CQI. All possible SCell state transitions are allowed, i.e., all transitions between any two of the following are allowed: activated SCell state, deactivated SCell state and dormant SCell state.

In legacy multicarrier operation, the SCell, upon SCell setup, (e.g., upon the RRC connection reconfiguration) is in the deactivated SCell state. This means that after the reconfiguration, the SCell needs to be activated by sending a separate MAC-CE command to the UE, e.g., via the PCell. During standardization efforts in 3GPP, a feature referred to herein as 'direct SCell activation' has been introduced. This feature enables the network node to reconfigure the new SCell in either the activated SCell state or in the dormant SCell state. To enable this, the RRC connection reconfiguration message contains a new field called sCellState, which indicates the SCell state as either activated or dormant. If the field sCellState is absent, then the SCell is configured in the deactivated state. The direct SCell activation can significantly reduce the overall delay to activate the SCell compared to the legacy approach of two-stage reconfiguration and activation of the SCell. Direct SCell activation may also be interchangeably referred to as SCell activation upon SCell reconfiguration, combined or joint SCell activation and SCell reconfiguration, combined or joint activation and reconfiguration of the SCell, etc.

Direct Scell activation raises certain challenges. Direct SCell activation has been introduced to enable faster activation of the SCell, i.e., during the SCell reconfiguration via RRC connection reconfiguration message. However, this also increases the UE complexity, since the UE has to reconfigure as well as activate the SCell (in either activated state or in dormant state).

SUMMARY

One example embodiment according to some aspects of the presently disclosed techniques and apparatus is a method, in a wireless device that supports carrier aggregation (CA), where the method comprises the steps of receiving a configuration message, from a wireless network node, indicating that the wireless device is to directly activate two or more secondary cells, and determining that at least a first one of the two or more secondary cells is to be activated by a first time and that at least a second one of the two or more secondary cells is to be activated by a second time, following the first time. This example method may further comprise the step of activating the first one of the secondary cells by the first time and subsequently activating the second one of the secondary cells by the second time.

Another example embodiment, which may be implemented as a network-side complement to the method described above, is a method performed by a wireless network node (e.g. a base station) in a wireless communication network that supports carrier aggregation (CA), where the method includes the steps of identifying a group of secondary cells to be directly activated by a wireless device, the group including at least a first one of the secondary cells that is to be directly activated at or by a first time and further including at least a second one of the secondary cells that is to be directly activated at or by a second time, following the first time, and sending a configuration message to the wireless device indicating that the group of secondary cells is to be directly activated by the wireless device. This example method may further include the step of performing one or more scheduling and/or power control tasks related to the secondary cells, based on knowledge of the first and second times.

DETAILED DESCRIPTION

Figure 1:
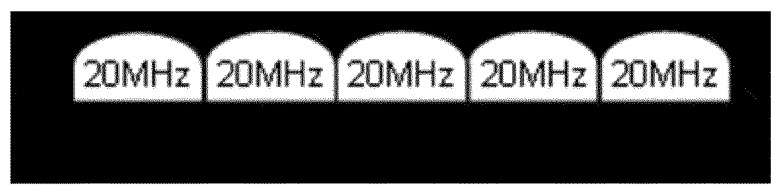
FIG. 1 is a schematic illustration of carrier aggregation (CA).

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

It is noted that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As noted above, direct SCell activation can facilitate faster activation of the SCell. However, a UE may be capable of supporting a large number of SCells, e.g., up to 32 SCells. In practice, a large number of SCells may be used for scheduling a high data rate. Providing for direct activation of a large number of SCells increases the demands on the UE, since the UE has to reconfigure as well as activate each SCell (in either activated state or in dormant state).

One approach that has been proposed is to limit the maximum number of SCells that can be directly activated at RRC connection reconfiguration to a small number, such as 1 or 2. However, this approach can limit the advantages of direct SCell activation. If the number of directly activated SCells is limited to a smaller number (for example one or two), then the network will have to separately activate each of the remaining SCells that are needed using the conventional two-stage approach, i.e., first configuring the SCell (e.g. using RRC reconfiguration) and then activating each SCell (e.g. by sending a MAC-CE message). This will increase delay and signaling overheads.

Described herein are techniques for directly activating two or more secondary cells from a single reconfiguration message in which the wireless device determines a first one of the secondary cells is to be activated at a first time and a second one the cells is to be activated at a second time following the first time, i.e. after the first time. By sequentially directly activating multiple SCells from a single reconfiguration message, the overall SCell activation delay may be reduced even when the UE is configured to directly activate large number of SCells. At the same time, the burden on the UE may be reduced compared to an approach in which many Scells must be directly activated at once (i.e. non-sequentially in time). Signaling overheads may also be reduced compared to an approach in which the number of SCells that can be directly activated is strictly limited, since the network can directly activate all or most of the SCells using the direct activation procedure. These and other advantages will be described in more detail below.

Figure 2:
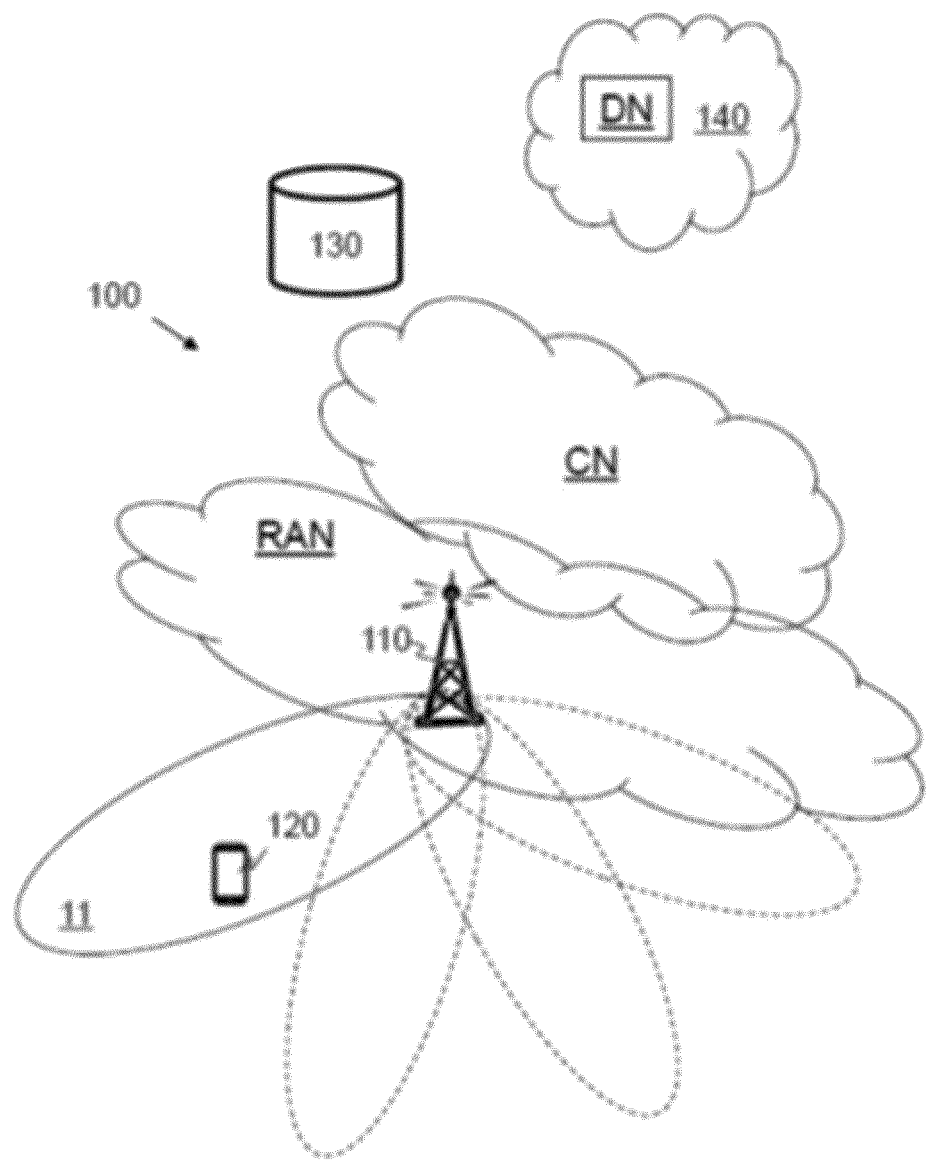
FIG. 2 is a schematic illustration of an example wireless communication network.

FIG. 2 shows a schematic overview of a wireless communications network 100. The wireless communications network 100 comprises one or more radio access networks (RANs) and one or more core networks (CNs). The wireless communications network 100 may use a number of different technologies, such as Wi-Fi, Long Term Evolution (LTE), LTE-Advanced, 5G or New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cellA wireless device may also be referred to interchangeably as a "device", such as a mobile station, a non-access point (non-AP) STA, an STA or a wireless terminal. In this example, the wireless devices are UEs 120. The UE herein can be any type of wireless device capable of communicating with network node or another UE over radio signals. The UE may also be radio communication device, target device, device to device (D2D) UE, machine type UE or UE capable of machine-to-machine communication (M2M), a sensor equipped with UE, Tablet, mobile terminals, smart phone, laptop embedded equipped (LEE), laptop mounted equipment (LME), USB dongles, Customer Premises Equipment (CPE) etc.

The wireless communications network 100 comprises a radio network node 110 providing radio coverage over a geographical area, denoted as the service area 11, which may also be referred to as a beam or a beam group of a first radio access technology (RAT), such as 5G, LTE, Wi-Fi or similar. The term "radio network node" may refer to any kind of network node on the access node side of the radio link with the UE, and may refer to a radio network node such as base station; radio base station; base transceiver station; base station controller; network controller; evolved Node B (eNB); Node B; gNodeB; multi-RAT base station; Multi-cell/multicast Coordination Entity (MCE); relay node, access point; radio access point; Remote Radio Unit (RRU) Remote Radio Head (RRH); a core network node (e.g., MME, SON node, a coordinating node, positioning node, MDT node, etc.); or even an external node (e.g., third party node, a node external to the current network), etc. In general, radio network 110 is a network unit capable of communicating with a wireless device within the service area served by the network node 110 depending e.g. on the first radio access technology and terminology used. The radio network node 110 may be referred to as a serving radio network node and communicates with the UE 120 with Downlink (DL) transmissions to the UE 120 and Uplink (UL) transmissions from the UE 120.

It is noted that the term "radio node" may be used to denote a wireless device/UE or a radio network node.

A core network node 130, may operate in the wireless communications network 100.

In the examples herein, a UE (e.g. UE 120) is capable of multicarrier operation (e.g., carrier aggregation, multi-connectivity such as dual connectivity, EN-DC, NE-DC, etc.) and configured with at least one serving cell. This cell may be referred to as a first cell (cell1). Examples of cell1 are a PCell, PSCell etc. The UE is configured by the network node to perform direct activation of at least two group of SCells (a first group of SCells (G1), and a second group of SCell (G2)) at the RRC configuration of the SCell. Each SCell group consists of at least one SCell. For example, G1 and G2 contain at least a first SCell (SCell1) and a second SCell (SCell2), respectively. Thus, in some examples, each group of SCells may contain only a single SCell. The groups differ in terms of their respective SCell activation times. For example, SCells in the same group are activated within the same time period, but different groups have different activation times. This will be explained in more detail below.

In direct SCell activation at RRC configuration of the SCell, upon completion of the RRC configuration procedure the SCell is either in an activated SCell state or the dormant SCell state. In other words, upon directly activating an SCell, that SCell may either be in the activated SCell state or a dormant SCell state.

As explained above, in the SCell activated state, the UE may monitor down link channels (e.g., PDSCH or PDCCH) for that SCell; transmit any configured or scheduled uplink signals (e.g., SRS, PUCCH, PUSCH, RACH, etc.) in case the SCell also consists of uplink; report channel state information (CSI) for the SCell on PCell and/or on the UL SCell etc. In the SCell deactivated state, the UE does not perform any of the above actions. In the dormant SCell state, the UE is not required to monitor PDSCH or PDCCH for the SCell and does not transmit in the uplink (e.g., does not transmit SRS, PUCCH, PUSCH, RACH, etc.). The UE may still report channel quality information (CQI) for an SCell in dormant SCell state with some configurable periodicity, e.g., according to the CQI configuration parameters defined for this state, e.g., cqi-pmi-ConfigIndexDormant, ri-ConfigIndexDormant, csi-SubframePatternDormant and cqi-FormatIndicatorDormant.

The term direct SCell activation refers to the procedures that enables the UE to activate one or more SCells at the RRC configuration procedure. That is, the UE shall activate the one or more SCells upon completion of the RRC configuration procedure. In this case the UE is configured with an RRC configuration message which also contains information about the SCells which should be directly activated by the UE. In other words, both configuration and activation of an SCell are done using the same message and within the same procedure. By 'activation', the UE either configures the SCell in the activated state or in the dormant state. Therefore, the UE activates the SCell such that the SCell is either in SCell activated or in SCell dormant state. The RRC connection reconfiguration message further contains information whether a particular SCell should be set to SCell activated state or SCell dormant state upon the RRC connection reconfiguration. Examples of such information within the RRC configuration message is the parameter called 'sCellState'. As an example, if the parameter sCellState is set to dormant for a SCell then the UE sets that SCell in the dormant SCell state upon the completion of RRC configuration. In another example if sCellState is set to activated for a SCell then the UE sets that SCell in the activated SCell state upon the completion of RRC configuration. If the parameter, sCellState, is missing for a SCell then that SCell is in deactivated state upon the completion of the RRC configuration procedure. An example of the RRC configuration message is, "RRCConnectionReconfiguration". After successfully completing the RRC configuration of SCells, the UE sends an acknowledge message to the network node. An example of an acknowledge message is, "RRCConnectionReconfigurationcomplete".

According to one aspect of the presently disclosed techniques, the UE directly activates all SCells in G1 within a first time period (T1) starting from a reference time (Tr) and activates all SCells in G2 within a second time period (T2) starting from Tr, where T2>T1. An example of the reference time is the moment or time instance (e.g. time resource such as subframe or slot) when the UE receives a message to directly activated the SCells e.g. when the UE receives the RRC configuration message. As a special case, G1 contains one SCell (e.g., SCell1) and/or G2 contains one SCell (e.g., SCell2). Upon successful activation of the SCell the UE sends a valid CSI measurement results to the network node (e.g., to PCell). An example of valid CSI is one of the predefined CQI with a non-zero index.

As described above, SCells in different groups are directly activated within different activation times. Therefore, the UE may implement a mechanism to determine the association between the SCell groups and their corresponding activation time periods. Therefore, according to another aspect of the presently disclosed techniques, the UE obtains information about a group of SCells in order to determine which SCells should be directly activated within T1 and which ones within T2. In one example, the UE determines information about the SCell group based on an indication received from the network node e.g. an identifier of SCells belonging to different groups. For example, SCells with ID=0 and 1 belong to G1 and SCells with ID=2, 3 and 4 belong to G2. In another example the UE determines information about the group based on one or more pre-defined rules e.g. an association between the ID of SCells (e.g. indices of SCells such as 'SCellindex') in the RRC connection reconfiguration messages and the SCell activation times. For example, assume SCell1 and SCell2 are associated with SCell index=1 and SCell index=2 respectively. The UE is configured with the indices of the SCells in the RRC configuration message. According to one example of the rule the UE shall assume that the SCell1 and SCell2 need to be activated within T1 and T2 respectively with respect to the reference time. In this example the UE then shall directly activate SCell1 and SCell2 within T1 and T2 with respect to the reference time, Tr.

The rule can be applied to any number of SCell groups. For example, assume five SCell groups, each containing one SCell. In this example, the UE assumes that the SCell indices with 1, 2, 3, 4 and 5 belong to groups G1, G2, G3, G4 and G5 respectively. The SCells in G1, G2, G3, G4 and G5 are activated within time periods, T1, T2, T3, T4 and T5 respectively, where T1<T2<T3<T4<T5. To enable this rule, the network node may assign the SCell IDs (e.g. SCell indices) in RRC configuration message according to the priority or significance or importance of different SCells. One or more criteria to determine the SCell indices is up to the network node implementation. Examples of such criteria are load (e.g., amount of traffic) from other UEs on each potential SCell, frequency band or frequency range of the potential SCells, type of data or services used for transmission on different potential SCells, signal quality of potential SCells etc. Examples of load in terms of traffic are average bit rate, throughput, number of active UEs served on the same potential SCell etc. Examples of signal quality are SNR, SINR, RSRQ etc. For example, SCell with smallest amount of traffic (e.g. lowest bitrate) from other UEs is assigned the smallest SCell index. In another example SCell which requires largest data rate is assigned the smallest SCell index. In yet another example SCell which is associated lowest frequency is assigned the smallest SCell index. In yet another example SCell with highest signal quality is assigned the smallest SCell index. These criteria will ensure that the most important SCell in terms of for example highest signal quality, lowest load etc is activated within the shortest possible time. Therefore, the method enables the UE to activate different SCells over different times based on their significance, which in turn is determined by the network node e.g. by explicit indication to the UE or by setting SCell indices.

The activation time periods for SCells in different groups (e.g. T1 and T2 for G1 and G2 respectively) can be predefined or they can be determined by the UE based on one or more pre-defined relations or requirements. The values of the SCell activation time periods (e.g. T1, T2 etc) can also be associated with UE capability, where T1<T2. The values of the SCell activation time periods (e.g. T1, T2 etc) can also be configured at the UE by the network node. This is described with several examples below.

For example, assuming two groups G1 and G2, $T1 = T_{RRC} + T_{activate1}$; and $T2 = T_{RRC} + T_{activate2}$, where:

$T_{RRC}$=time to process the RRC configuration message (e.g., RRCConnectionReconfiguration) which is received by the UE in time resource n, e.g., in subframe number n. This is also called as RRC procedure delay.

$T_{activate1}$=time to activate SCells in G1

$T_{activate2}$=time to activate SCells in G2

In this first example, the UE may start activating the SCell(s) immediately after it has processed the received RRC configuration message (e.g., RRCConnectionReconfiguration message) for directly activating the SCells. In this case, example values of $T_{RRC}$, $T_{activate1}$ and $T_{activate2}$ may be:

$T_{RRC}$=20 ms, $T_{activate1}$=20 ms and $T_{activate1}$=40 ms

In another (second) example, the UE may start activating the SCell(s) only after sending the RRC configuration complete message (e.g., RRCConnectionReconfigurationComplete message) to the network node. The message is sent after it has processed the received RRC configuration message (e.g., RRCConnectionReconfiguration message) and has received UL grant for sending the message to the network node. In this case, the values of $T_{activate1}$ and $T_{activate2}$ may be given by:

$$T_{activate1} = T_{UL\_GRANT} + T_{RRC\_PHY} + T_{PHICH\_PROC} + 20 \text{ ms,}$$

$$T_{activate2} = T_{UL\_GRANT} + T_{RRC\_PHY} + T_{PHICH\_PROC} + 40 \text{ ms.}$$

where:

$T_{UL\_GRANT}$ is the time required by the UE to UE receive the UL grant for sending RRCConnectionReconfigurationComplete message to the network node; and $T_{RRC\_PHY}$ is the time between the reception of the UL grant for sending RRCConnectionReconfigurationComplete until the reception of the ACK for sending RRCConnectionReconfigurationComplete to the network node; and $T_{PHICH\_PROC}$ is the processing delay for PHICH, which in some examples is 2 ms.

The above examples can further be generalized for any number of group (k) of one or more SCells e.g. G1, G2, G3, ... Gk. For example, the UE may activate the SCells in G1, G2, G3, ... Gk within time periods T1, T2, T3, ... Tk, respectively, starting from the reference time, Tr. Where T1, T2, T3, ... Tk are related as follows: T1<T2<T3<, ..., <Tk.

For example, the values of T1, T2, T3, ... Tk following the approach in above in the first example can be expressed as follows:

$$T1 = T_{RRC} + T_{activate1}; T2 = T_{RRC} + T_{activate2}; T3 = T_{RRC} + T_{activate3}; Tk = T_{RRC} + T_{activate\_k}$$

where:

Tactivate3=time to activate SCells in G3

Tactivate_k=time to activate SCells in Gk

As an example, $T_{activate3}$=60 milliseconds (ms) and $T_{activate\_k}$=k*20 ms.

Figure 3:
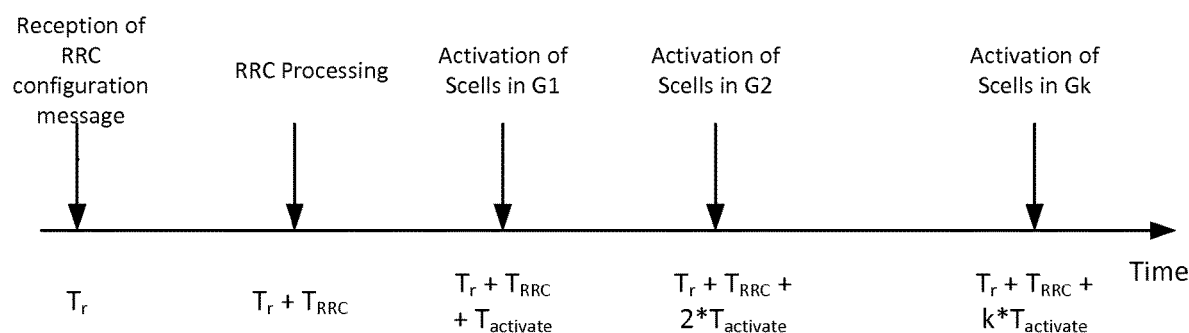
FIG. 3 illustrates a set of times by which a respective group of one or more SCells are directly activated.

This above example is illustrated in FIG. 3, which shows the time instance or moment at which SCells of different SCell groups are successfully activated by the UE i.e. in activated SCell state or in dormant SCell state at SCell configuration.

Using the approach of the first example, with respect to or starting from the reference time (Tr), the time (Tj) required by the UE to directly activate the SCell(s) belonging to certain group number 'Gj' can be expressed by the following generalized expression:

$$Tj = T_{RRC} + j * T_{activate}$$

The time $T_{activate}$ at or by which the UE shall be able to directly activate the SCell further depends upon the specified conditions. If the conditions are met, then the SCell is considered to be known to the UE. Otherwise the SCell is considered to be unknown to the UE. For example, $T_{activate}$ 20 ms if certain pre-defined conditions are met for that SCell, e.g. the SCell is known if the UE has measured the SCell in the last 5 seconds or 5 DRX cycles and the SINR is above certain threshold. Otherwise, the SCell is unknown if the UE has not measured the SCell in the last 5 seconds or last 5 DRX cycles then $T_{activate}$ 30 ms provided that the UE can successfully detected the SCell on the first attempt.

Following the approach in the second example, the values of T1, T2, T3, ... Tk, can be expressed as follows when the SCell is known:

$$T1 = T_{RRC} + T_{activate1}; \text{ where: } T_{activate1} = T_{UL\_GRANT} + T_{RRC\_PHY} + T_{PHICH\_PROC} + 20 \text{ ms}$$

$$T2 = T_{RRC} + T_{activate2}; \text{ where: } T_{activate2} = T_{UL\_GRANT} + T_{RRC\_PHY} + T_{PHICH\_PROC} + 40 \text{ ms,}$$

$$T3 = T_{RRC} + T_{activate3}; \text{ where: } T_{activate3} = T_{UL\_GRANT} + T_{RRC\_PHY} + T_{PHICH\_PROC} + 60 \text{ ms}$$

$$Tk = T_{RRC} + T_{activate\_k}; \text{ where: } T_{activate\_k} = T_{UL\_GRANT} + T_{RRC\_PHY} + T_{PHICH\_PROC} + k*20 \text{ ms}$$

Alternatively, when the SCell is unknown, the values of T1, T2, T3, ... Tk, following the approach in the second example can be expressed as follows:

$$T1 = T_{RRC} + T_{activate1} \text{ where: } T_{activate1} = T_{UL\_GRANT} + T_{RRC\_PHY} + T_{PHICH\_PROC} + 30 \text{ ms}$$

$$T2 = T_{RRC} + T_{activate2}; \text{ where: } T_{activate2} = T_{UL\_GRANT} + T_{RRC\_PHY} + T_{PHICH\_PROC} + 60 \text{ ms,}$$

$$T3 = T_{RRC} + T_{activate3}; \text{ where: } T_{activate3} = T_{UL\_GRANT} + T_{RRC\_PHY} + T_{PHICH\_PROC} + 90 \text{ ms}$$

$$Tk = T_{RRC} + T_{activate\_k}; \text{ where: } T_{activate\_k} = T_{UL\_GRANT} + T_{RRC\_PHY} + T_{PHICH\_PROC} + k*30 \text{ ms}$$

In general, following the approach in the second example, the time (Tj) required by the UE to directly activate the SCell(s) belonging to certain group number 'Gj' can be expressed as:

$$Tj = T_{RRC} + T_{UL\_GRANT} + T_{RRC\_PHY} + T_{PHICH\_PROC} + j * T_{activate}.$$

The activation time periods (e.g., T1 and T2) can also be related to each other by a certain relation or function. A general example of the relation for two groups are: T2=f(T1). A specific example of the relation is T2=α*T1 etc. Examples of α are 2, 3 etc. A general example of the relation for three groups are: T2=f1(T1) and T3=f2(T2). A specific example of the relation is T2=α1*T1 and T3=α2*T2 etc. This example can be generalized for any number of groups of SCells.

In some examples, there may be requirements placed on the direct SCell activation delay at the RRC Reconfiguration that the UE is to try and satisfy. These requirements may apply to a UE (e.g. UE 120) with PCell or with PCell and one or more SCells in an activated or dormant state. The requirements may be applicable for E-UTRA FDD, E-UTRA TDD and E-UTRA TDD-FDD carrier aggregation.

In these examples, if the parameter sCellState is set to activated for the SCell within the RRC reconfiguration message, then the UE shall configure that SCell in the activated state upon successful completion of the RRC reconfiguration procedure within a specified delay. But if the parameter sCellState is set to dormant for the SCell within the RRC reconfiguration message then the UE shall configure that SCell in the dormant state upon successful completion of the RRC reconfiguration procedure within the specified delay.

The delay within which the UE shall be able to configure one or more SCells in the activated or dormant state may depend upon specified conditions.

For example, upon receiving an RRC reconfiguration message in subframe n, the UE shall be capable to transmit a valid CSI report and apply actions related to the RRC reconfiguration of a $j^{th}$ SCell in an activated or dormant state no later than in subframe $n+T_{RRC\_Process}+j*20$ provided the following conditions are met for the j'th SCell:

During the period equal to max(5 measCycleSCell, 5 DRX cycles) before the reception of the SCell reconfiguration message:
the UE has sent a valid measurement report for the SCell being configured in the activated or dormant state; and
the SCell being activated remains detectable according to cell identification conditions. The cell identification conditions may for example be those specified in 3GPP specification TS 36.133 section 8.3.3.2.
the SCell being reconfigured in activated or dormant state also remains detectable during the direct SCell activation delay according to the cell identification conditions. The cell identification conditions may for example be those specified in 3GPP specification TS 36.133 section 8.3.3.2.

Otherwise (i.e. if at least one of the conditions above is not met), upon receiving the RRC reconfiguration message in subframe n, the UE shall be capable to transmit a valid CSI report and apply actions related to the RRC reconfiguration of the $j^{th}$ SCell in an activated or dormant state no later than in subframe $n+T_{RRC\_Process}+j*30$ provided the SCell can be successfully detected on the first attempt.

Where:
$T_{RRC\_Process}$ is an RRC procedure delay. The RRC procedure delay may be that defined in section 11.2 of 3GPP TS 36.133; and
$j(1 \leq j \leq N)$ denotes the index of the SCell indicated in the RRC reconfiguration message, where N is the maximum number of SCells included in the RRC reconfiguration message and shall not exceed the maximum number of SCells supported by the UE.

If there is no reference signal received for the CSI measurement over the delay corresponding to the minimum requirements specified above, then the UE may report the corresponding valid CSI for the SCell configured in an activated or dormant state on the next available uplink reporting resource after receiving the reference signal.

The direct SCell activation delay explained above can be extended with each Sounding Reference Signal (SRS) carrier-based switching to any carrier occurring during the SCell reconfiguration procedure. If there are no uplink resources for reporting the valid CSI in subframe $n+T_{RRC\_Process}+j*20$ or $n+T_{RRC\_Process}+j*30$ for the $j^{th}$ SCell (i.e. there no uplink resources within the required delay) or uplink transmission is interrupted due to SRS carrier-based switching, then the UE shall use the next available uplink resource for reporting the corresponding valid CSI.

In addition to CSI reporting explained above, the UE may also apply other actions related to the RRC reconfiguration of SCell(s) in an activated or dormant state specified at the first opportunities for the corresponding actions once the SCell is configured in the activated or dormant state.

If the UE is configured with only a PCell then the interruption will occur on PCell due to the RRC reconfiguration of SCell(s) in the activated or dormant state. In this case:
If the PCell belongs to E-UTRA FDD, the PCell interruption shall not occur after subframe $n+T_{RRC\_Process}+4$. The PCell interruption may be that defined in 3GPP TS 36.133 section 7.8.2.
If the PCell belongs to E-UTRA TDD, the PCell shall not occur after subframe $n+T_{RRC\_Process}+6$. The PCell interruption may be that defined in 3GPP TS 36.133 section 7.8.2.
If the UE is configured with at least one SCell in an activated or dormant state then the interruption shall occur on PCell and on all the SCells in the activated or dormant state. In this case:
The interruption on the PCell and/or on the SCell in the activated or dormant state shall not occur after subframe $n+T_{RRC\_Process}+6$ if:
the PCell and/or the SCell in activated or dormant state being interrupted and the SCell being configured in activated or dormant state belong to E-UTRA TDD; or
the SCell in activated or dormant state being interrupted and the SCell being configured in activated or dormant state belong to E-UTRA FDD and the PCell belongs to E-UTRA TDD.
Otherwise, the interruption on PCell and/or on the SCell in activated or dormant state shall not occur after subframe $n+T_{RRC\_Process}+4$.

Starting from the subframe in which the UE receives an activation command for a secondary cell (e.g. the subframe the UE receives the RRC configuration message) and until the UE has configured the SCell in an activated or in dormant state, the UE shall report CQI index=0 (out of range) if the UE has available uplink resources to report CQI for the SCell.

Another set of examples will now be described in which there are requirements placed on the direct SCell activation delay at the RRC Reconfiguration during cell handover that the UE is to try and satisfy. The requirements in this set of examples shall apply for a UE:
configured with PCell or with PCell and one or more SCells in an activated or dormant state;
when the reconfiguration message to configure one or more SCells in the activated or dormant state is sent in a handover command for performing RACH-less handover; and
when the uplink grant is provided by the old PCell to the target PCell in the handover command.

The requirements in this set of examples may be applicable for E-UTRA FDD, E-UTRA TDD and E-UTRA TDD-FDD carrier aggregation.

If the parameter sCellState is set to activated for the SCell within the RRC reconfiguration message, then the UE shall configure that SCell in the activated state upon successful completion of the RRC reconfiguration procedure within a specified delay. But if the parameter sCellState is set to dormant for the SCell within the RRC reconfiguration message then the UE shall configure that SCell in the dormant state upon successful completion of the RRC reconfiguration procedure within the specified delay.

The delay within which the UE shall be able to configure one or more SCells in activated or dormant state may depend upon the specified conditions.

Upon receiving an RRC reconfiguration message in the handover command for performing RACH-less handover in subframe n, the UE shall be capable to transmit a valid CSI report and apply actions related to the RRC reconfiguration of the $j^{th}$ SCell in the activated or dormant state no later than in subframe $n+T_{RRC\_Process}+T_{interrupt}+j*20$ provided the following conditions are met for the $j^{th}$ SCell:

During the period equal to max(5 measCycleSCell, 5 DRX cycles) before the reception of the SCell reconfiguration message:
  the UE has sent a valid measurement report for the SCell being configured in the activated or dormant state; and
  the SCell being activated remains detectable according to cell identification conditions. The cell identification conditions may be those specified in 3GPP TS 36.133 section 8.3.3.2;
  the SCell being reconfigured in the activated or dormant state also remains detectable during the direct SCell activation delay according to cell identification conditions. The cell identification conditions may be those specified in 3GPP TS 36.133 section 8.3.3.2.

Otherwise (i.e. if one of the conditions above is not satisfied), upon receiving the RRC reconfiguration message in subframe n, the UE shall be capable to transmit valid CSI report and apply actions related to the RRC reconfiguration of $j^{th}$ SCell in the activated or dormant state no later than in subframe $n+T_{RRC\_Process}+T_{interrupt}+j*30$ provided the SCell can be successfully detected on the first attempt.

Where:
  $T_{RRC\_Process}$ is an RRC procedure delay. The RRC procedure delay may be as defined in section 11.2 of 3GPP TS 36.133;
  $T_{interrupt}$ is the interruption time for RACH-less handover when an UL grant is provided in the RRC reconfiguration message. The interruption time may be as defined in section 5.1.2.1.2 of 3GPP TS 36.133;
  $j(1 \leq j \leq N)$ denotes the index of the SCell indicated in the RRC reconfiguration message, where N is the maximum number of SCells included in the RRC reconfiguration message and shall not exceed the maximum number of SCells supported by the UE.

If there is no reference signal received for the CSI measurement over the delay corresponding to the minimum requirements specified above, then the UE may report corresponding valid CSI for the SCell configured in the activated or dormant state on the next available uplink reporting resource after receiving the reference signal.

The direct SCell activation delay specified in this set of examples can be extended with each SRS carrier-based switching to any carrier occurring during the SCell reconfiguration procedure.

In addition to CSI reporting explained above, UE may also apply other actions related to the RRC reconfiguration of SCell(s) in the activated or dormant state at the first opportunities for the corresponding actions once the SCell is configured in the activated or dormant state.

If the UE is configured with only PCell, then the interruption shall occur on the PCell due to the RRC reconfiguration of SCell(s) in the activated or dormant state. In this case:
  If the PCell belongs to E-UTRA FDD, the PCell interruption shall not occur after subframe $n+T_{RRC\_Process}+T_{interrupt}+4$. The PCell interruption may be as specified in section 7.8.2 of 3GPP TS 36.133.
  If the PCell belongs to E-UTRA TDD, the PCell interruption shall not occur after subframe $n+T_{RRC\_Process}+T_{interrupt}+6$. The PCell interruption may be as specified in section 7.8.2 of 3GPP TS 36.133.

If the UE is configured with at least one SCell in the activated or dormant state, then the interruption shall occur on the PCell and on all the SCells in the activated or dormant state. In this case:
  The interruption on the PCell and/or on the SCell in the activated or dormant state shall not occur after subframe $n+T_{RRC\_Process}+T_{interrupt}+6$ if:
    the PCell and/or the SCell in the activated or dormant state being interrupted and the SCell being configured in the activated or dormant state belong to E-UTRA TDD; or
    the SCell in the activated or dormant state being interrupted and the SCell being configured in the activated or dormant state belong to E-UTRA FDD and the PCell belongs to E-UTRA TDD.
  Otherwise (i.e. if neither of the above conditions are satisfied), the interruption on the PCell and/or on the SCell in the activated or dormant state shall not occur after subframe $n+T_{RRC\_Process}+T_{interrupt}+4$.

Starting from the subframe in which the UE receives an activation command for a secondary cell (e.g. the subframe the UE receives the RRC configuration message) and until the UE has configured the SCell in an activated or in dormant state, the UE shall report CQI index=0 (out of range) if the UE has available uplink resources to report CQI for the SCell.

All the above examples allow the UE to directly activate the SCell(s) at different times based on the importance and significance in terms of time criticality. This reduces the UE complexity and processing requirements compared to implementations in which the UE directly activates multiple SCells at the same time, i.e. not sequentially in time. To achieve this, the UE can activate the SCells or SCells in different groups in serial fashion. This mechanism also reduces signalling overheads as all SCells are activated using the same RRC configuration message. This method also reduces the network node complexity and enables the network to use all supported SCells by the UE for scheduling as early as possible.

Figure 4:
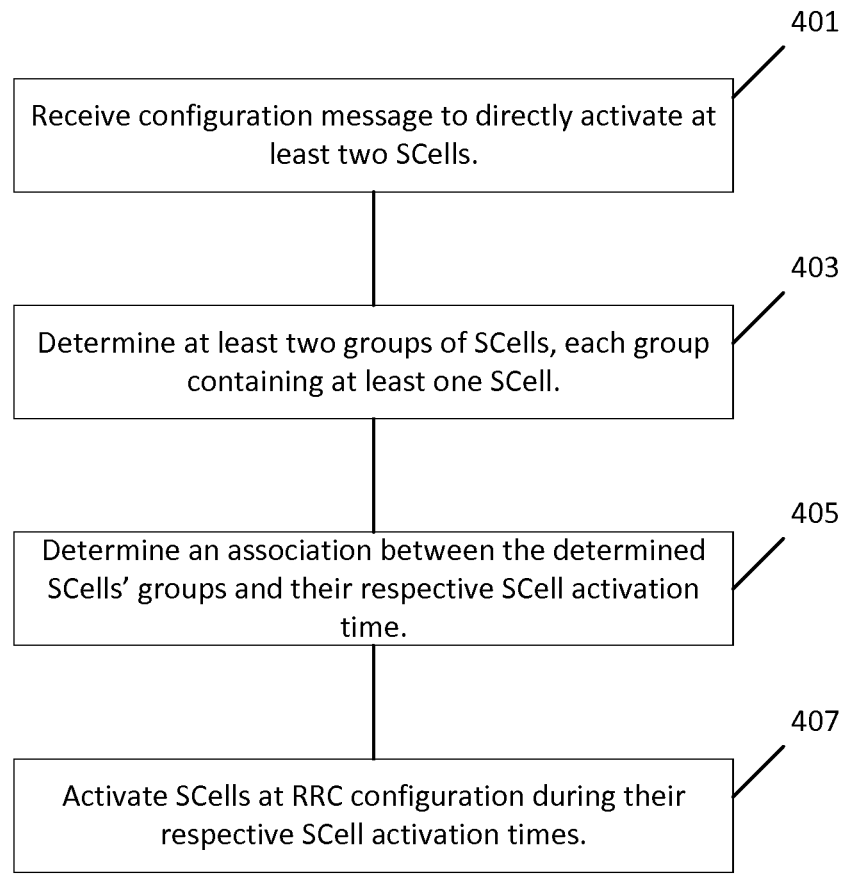
FIG. 4 is a flowchart of steps for an example method performed at a wireless device for directly activating a set of SCells sequentially in time.

FIG. 4 shows a flowchart illustrating a first example method performed at a UE.

At step 401, the UE receives a configuration message (e.g. an RRC configuration message) to directly activate at least two SCells. The configuration message may contain an 'SCellState' parameter to identify the SCells to be activated. As explained above, directly activating the SCells can cause the SCells to be in an activated or dormant state after the RRC configuration procedure.

At step 403, the UE determines at least two groups of SCells, each group containing at least one SCell. This determination may be made in accordance with any of the techniques described above. At step 405, the UE determines an association between the determined SCells' groups and their respective SCell activation times. This step may again be performed in accordance with any of the techniques described above.

At step 407, the UE causes the SCells to be activated by their respective SCell activation times. The UE can activate the SCells at the completion of the RRC configuration procedure; in other words, the UE can directly activate the SCells.

Figure 5:
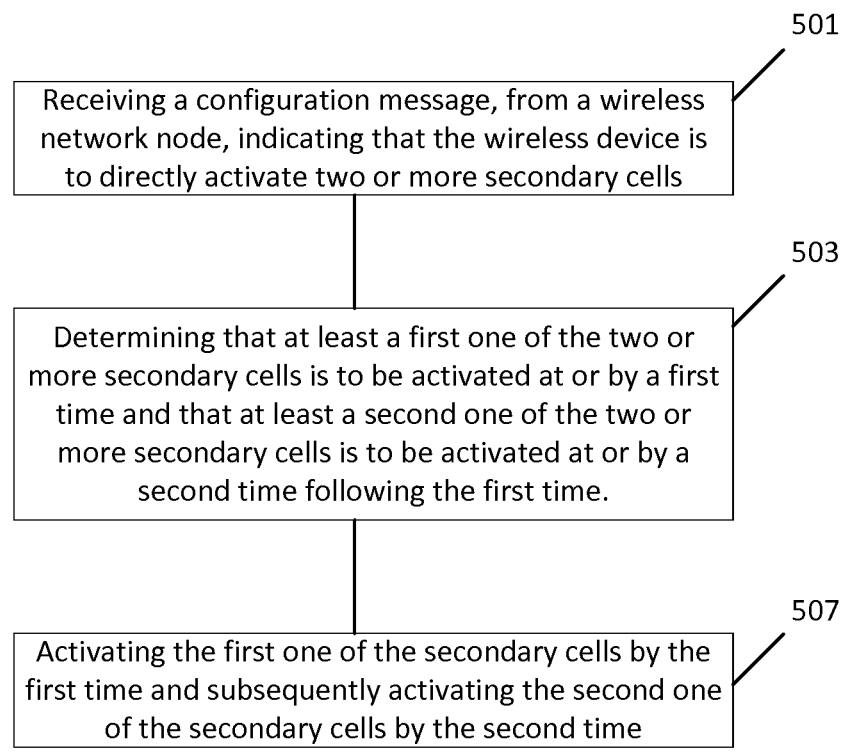
FIG. 5 is a flowchart of steps for a second example method performed at a wireless device for directly activating a set of SCells sequentially in time.

FIG. 5 shows a flowchart depicting a second example method in accordance with particular embodiments of the present disclosure performed at a wireless device (e.g. UE) that supports carrier aggregation.

At step 501, the wireless device receives a configuration message, from a wireless network node, indicating that the wireless device is to directly activate two or more secondary cells. The configuration message may be an RRC configuration message. The message may contain a parameter (e.g. the SCellState parameter) indicating the two or more secondary cells to be directly activated.

At step 503, the wireless device determines that at least a first one of the two or more secondary cells is to be activated at or by a first time and that at least a second one of the two or more secondary cells is to be activated at or by a second time, following the first time. That is, the second time is after the first time.

The wireless device may determine that the first one of the two or more secondary cells belongs to a first group of one or more secondary cells and that the second one of the two or more secondary cells belongs to a second group of one or more secondary cells. The wireless device may identify first and second times associated with the first group and the second group, respectively. In some of these embodiments, determining that the first one of the two or more secondary cells belongs to the first group of one or more secondary cells and that the second one of the two or more secondary cells belongs to the second group of one or more secondary cells is based on secondary cell indices corresponding to the first one and second one of the two or more secondary cells. In some embodiments, determining that the first one of the two or more secondary cells belongs to the first group of one or more secondary cells and that the second one of the two or more secondary cells belongs to the second group of one or more secondary cells is based on a pre-determined grouping of secondary cells. For example, this may involve receiving, from the wireless network node, configuration information defining the pre-determined grouping of secondary cells.

The method shown in FIG. 5 may comprise determining that the first one of the two or more secondary cells belongs to the first group of one or more secondary cells and that the second one of the two or more secondary cells belongs to the second group of one or more secondary cells based on grouping information received with or in association with the configuration message.

The first time and second time may be predefined. In some embodiments, the wireless device receives, from the network node, information defining at least the second time. This time might be referenced to any of the reference points discussed above.

The first and second times may be determined based on secondary cell indices for each of the first and second one of the secondary cells, e.g. using the techniques described above. These secondary cell indices may be indicated by the configuration message.

It should be appreciated that the method shown in FIGS. 4 and 5 can be extended to cover any number of groups of secondary cells. Thus, for example, in some embodiments, the method may further comprise determining that at least a third one of the two or more secondary cells is to be activated at or by a third time, following the first time (i.e. after the first time), and activating the third one of the secondary cells by the third time.

Figure 6:
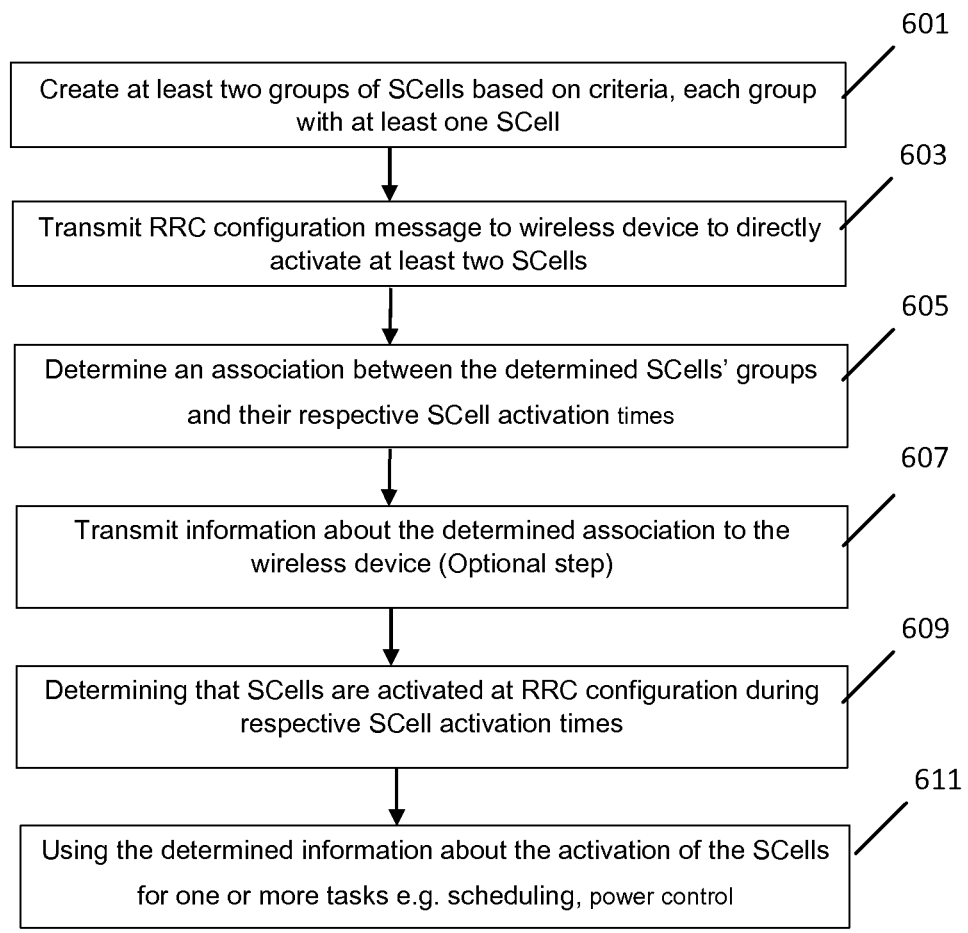
FIG. 6 is a flowchart of steps for an example method performed at a network node to cause a wireless device to directly activate a set of SCells sequentially in time.

FIG. 6 shows a flowchart of method steps performed by a wireless network node (e.g. base station) according to some embodiments of the present disclosure. At step 601, the network node creates at least two groups of SCells based on criteria, each group consisting of at least one SCell. The groups may be created according to any of the methods described above.

At step 603, the network node transmits a configuration message (e.g. an RRC configuration message) to a wireless device (e.g. a UE) to directly activate at least two SCells. At step 605 the network node determines an association between the determined SCells' groups and their respective SCell activation times. This step may be performed before step 603. At step 607, the network node transmits information about the determined association to the wireless device. This step is optional and may also be performed with or prior to step 603. At step 609, the network node determines that SCells are activated at the RRC configuration before the respective SCell activation times. At step 611, the network node uses the determined information about the activation of the SCells for one or more tasks e.g. scheduling or power control.

Figure 7:
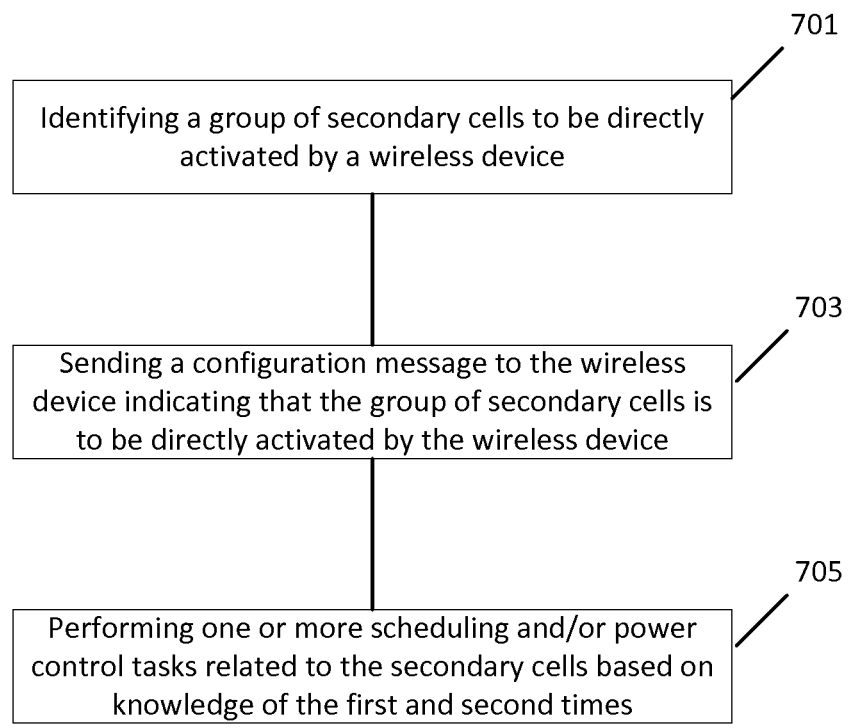
FIG. 7 is a flowchart of steps for a second example method performed at a network node to cause a wireless device to directly activate a set of SCells sequentially in time.

FIG. 7 depicts another method, in accordance with other example embodiments of the disclosure, which is implemented as a network-side complement to the method described above with respect to FIG. 5, in a base station or other network node in a wireless communication network that supports carrier aggregation (CA). The method includes, as shown at step 701, the step of identifying a group of secondary cells to be directly activated by a wireless device, the group including at least a first one of the secondary cells that is to be directly activated at or by a first time and further including at least a second one of the secondary cells that is to be directly activated at or by a second time, following the first time. At step 703, the network node sends a configuration message (e.g. an RRC configuration message) to the wireless device indicating that the group of secondary cells is to be directly activated by the wireless device. The message may contain a parameter (e.g. the 'SCellState' parameter) indicating the SCells to be directly activated. The method optionally includes, at step 705, the step of performing one or more scheduling and/or power control tasks related to the secondary cells, based on knowledge of the first and second times.

In some embodiments, the method shown in FIG. 7 further comprises transmitting information indicating that the first one of the secondary cells belongs to a first group, associated with the first time, and that the second one of the secondary cells belongs to a second group, associated with the second time. This information may be included in the configuration message, for example, and may comprise secondary cell indices corresponding to the first one and second one of the two or more secondary cells.

In some embodiments, this information comprises configuration information sent to the wireless device separately from the configuration message.

In some embodiments, the first time and second time are predefined. In other embodiments, the method further comprises sending, to the wireless device, information defining at least the second time.

Figure 8:
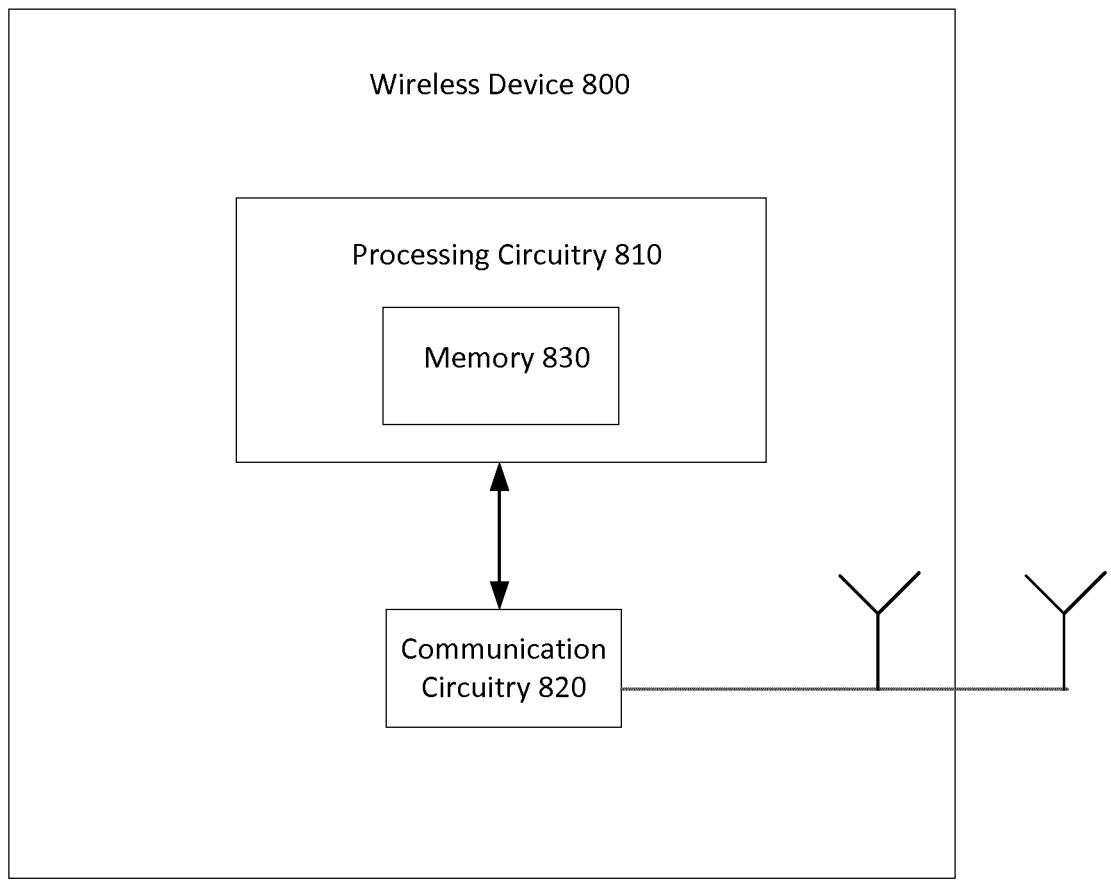
FIG. 8 shows an example wireless device configured to perform a method of directly activating a set of SCells sequentially in time.

FIG. 8 illustrates a wireless device 800 as implemented in accordance with one or more embodiments herein. The wireless device 800 could be an implementation of UE 120, for example. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform the processing described above, such as by executing instructions stored in memory 830. The processing circuitry 810 in this regard may implement certain functional means, units, or modules.

Figure 9:
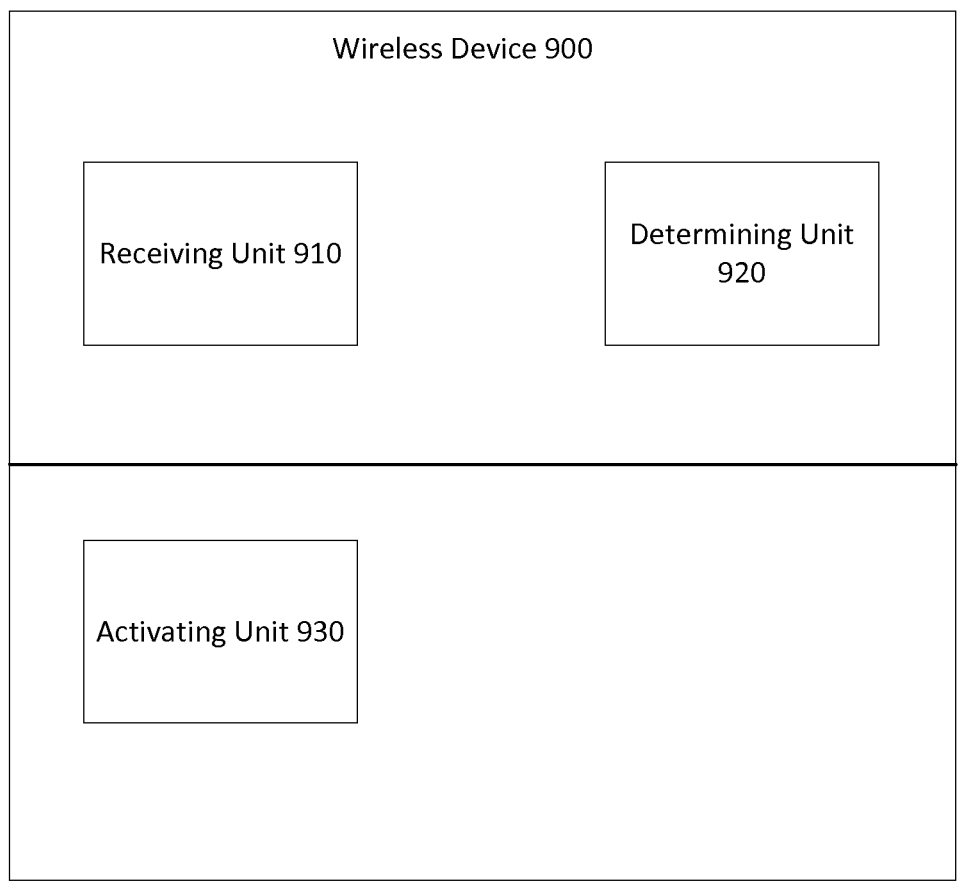
FIG. 9 shows a further example of a wireless device configured to perform a method of directly activating a set of SCells sequentially in time.
Figure 12:
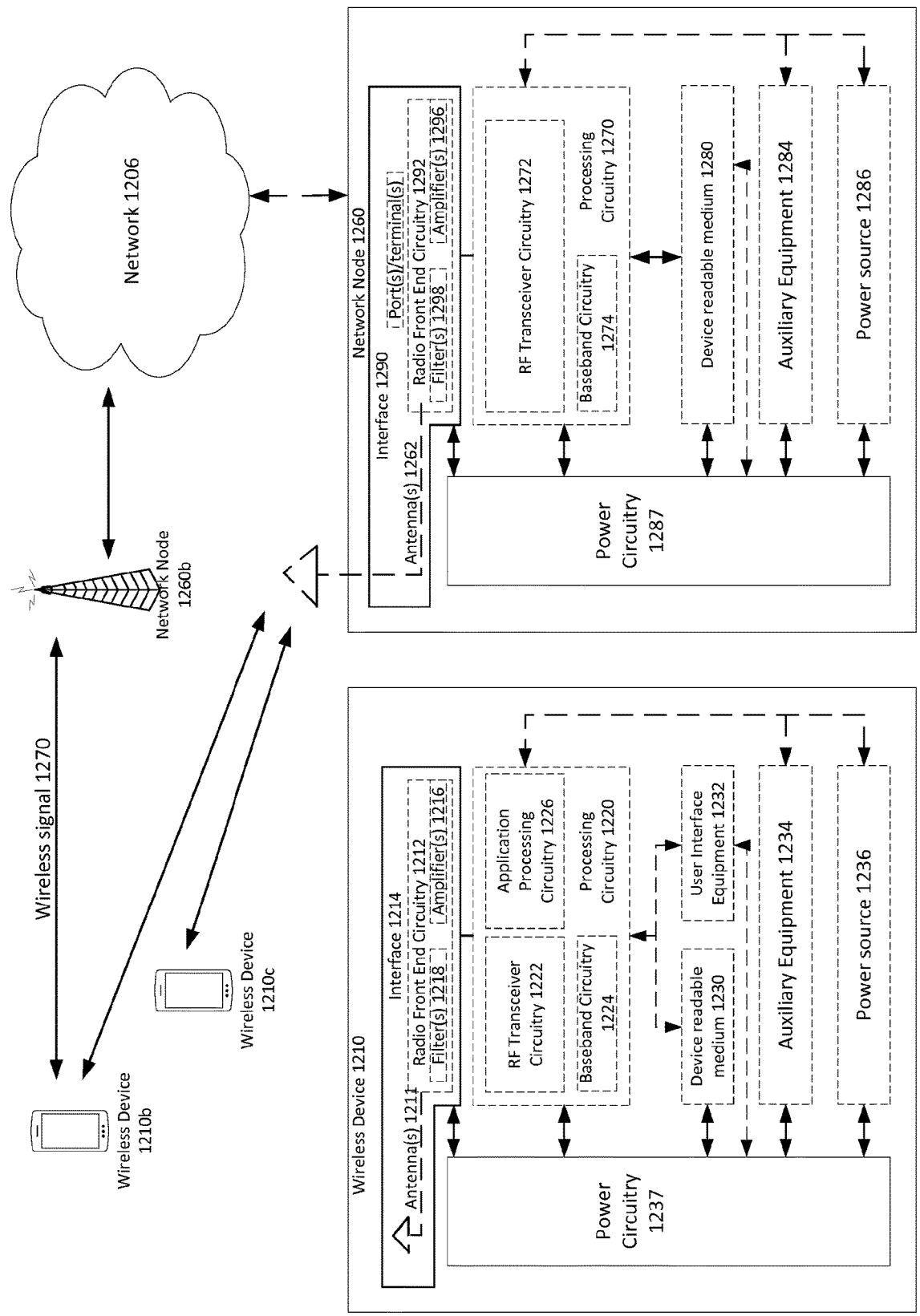
FIG. 12 shows a further example of a wireless communication network in which a wireless device and network node according to the embodiments disclosed herein may be implemented.

FIG. 9 illustrates a schematic block diagram of another example wireless device 900 in a wireless network (for example, the wireless network shown in FIG. 1 or 12). As shown, the wireless device 900 implements various functional means, units, or modules, e.g., via the processing circuitry 810 in FIG. 8 and/or via software code. These functional means, units, or modules, e.g., for implementing the method(s) herein, include for instance: receiving unit 910, determining unit 920, and activating unit 930. Receiving unit 910 is configured to receive a configuration message, from a wireless network node, indicating that the wireless device is to directly activate two or more secondary cells, as described above. Determining unit 920 is configured to determine that at least a first one of the two or more secondary cells is to be activated at or by a first time and that at least a second one of the two or more secondary cells is to be activated at or by a second time, following the first time, as described above. Activating unit 930 is configured to activating the first one of the secondary cells by the first time and subsequently activating the second one of the secondary cells by the second time, also as described above.

Figure 10:
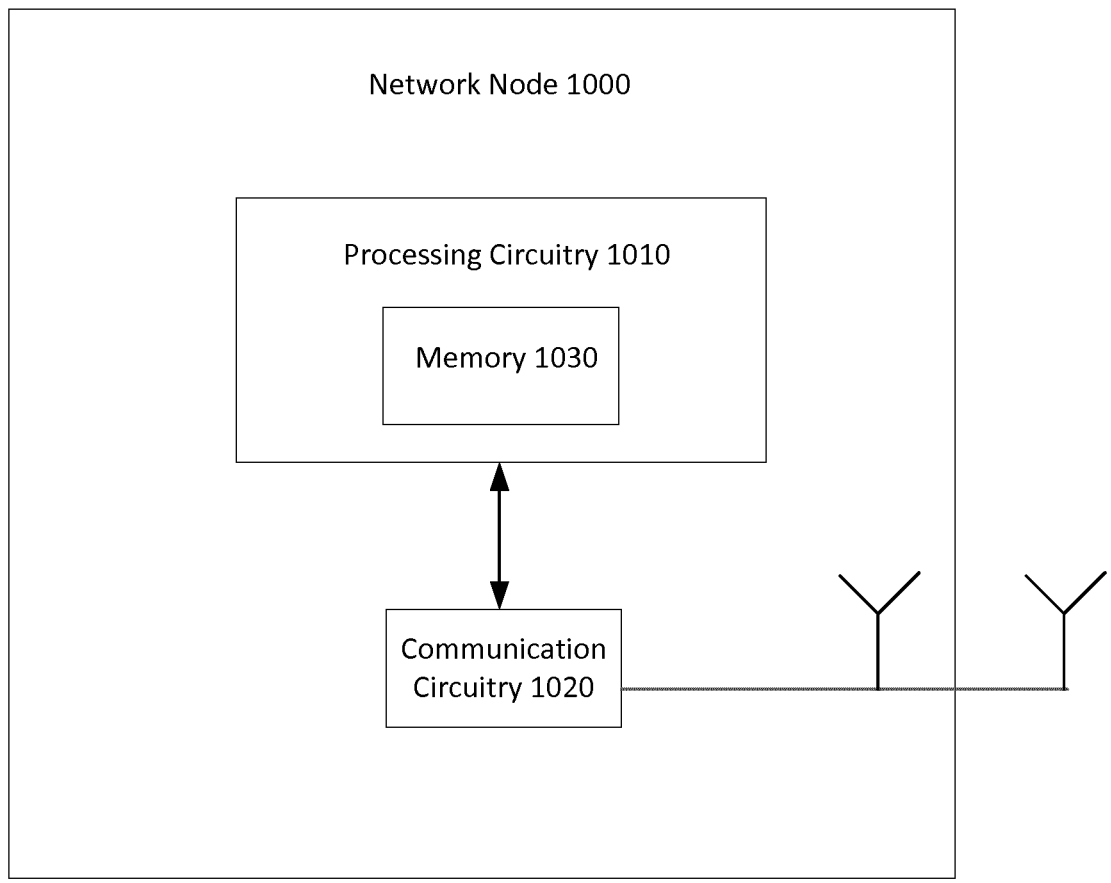
FIG. 10 shows an example of a network node configured to perform a method to cause a wireless device to directly activate a set of SCells sequentially in time.

FIG. 10 illustrates an example network node 1000 as implemented in accordance with one or more embodiments described herein. As shown, the network node 1000 includes processing circuitry 1010 and communication circuitry 1020. The communication circuitry 1020 is configured to transmit and/or receive information to and/or from one or more other nodes such as wireless device 800 or 900, e.g., via any communication technology. The processing circuitry 1010 is configured to perform processing methods described above, e.g. as summarised with respect to FIGS. 6 and 7, such as by executing instructions stored in memory 1030. The processing circuitry 1010 in this regard may implement certain functional means, units, or modules.

Figure 11:
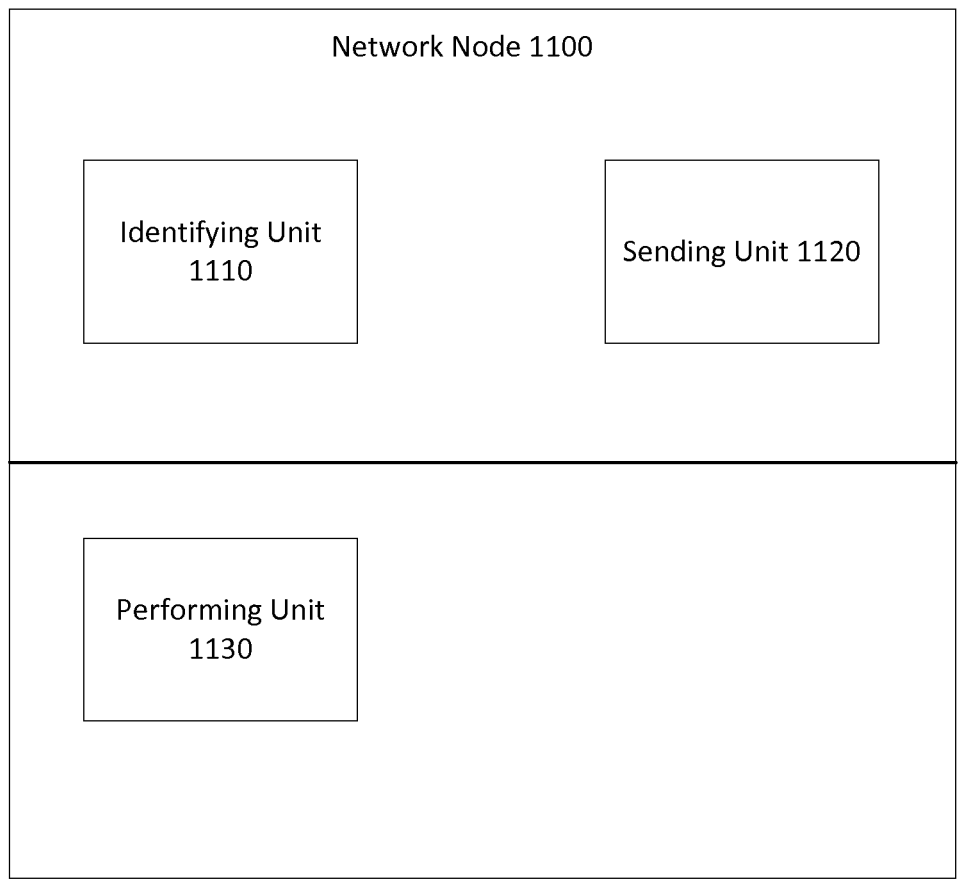
FIG. 11 shows a further example of a network node configured to perform a method to cause a wireless device to directly activate a set of SCells sequentially in time.

FIG. 11 illustrates a further example of a network node 1100 in a wireless network (for example, the wireless network shown in FIG. 1 or 12). As shown, the network node 1100 implements various functional means, units, or modules, e.g., via the processing circuitry 1010 in FIG. 10 and/or via software code. These functional means, units, or modules, e.g., for implementing the method(s) herein, include for instance: identifying unit 1110, sending unit 1120, and performing unit 1130. Identifying unit 1110 is configured to identify a group of secondary cells to be directly activated by a wireless device as described above, the group including at least a first one of the secondary cells that is to be directly activated at or by a first time and further including at least a first one of the secondary cells that is to be directly activated at or by a second time, following the first time. Sending unit 1120 is configured to send a configuration message (e.g. RRC configuration message) to the wireless device indicating that the group of secondary cells is to be directly activated by the wireless device, as described above. Performing unit 1130 is configured to perform one or more scheduling and/or power control tasks related to the secondary cells, based on knowledge of the first and second times.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and wireless devices (WDs) 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
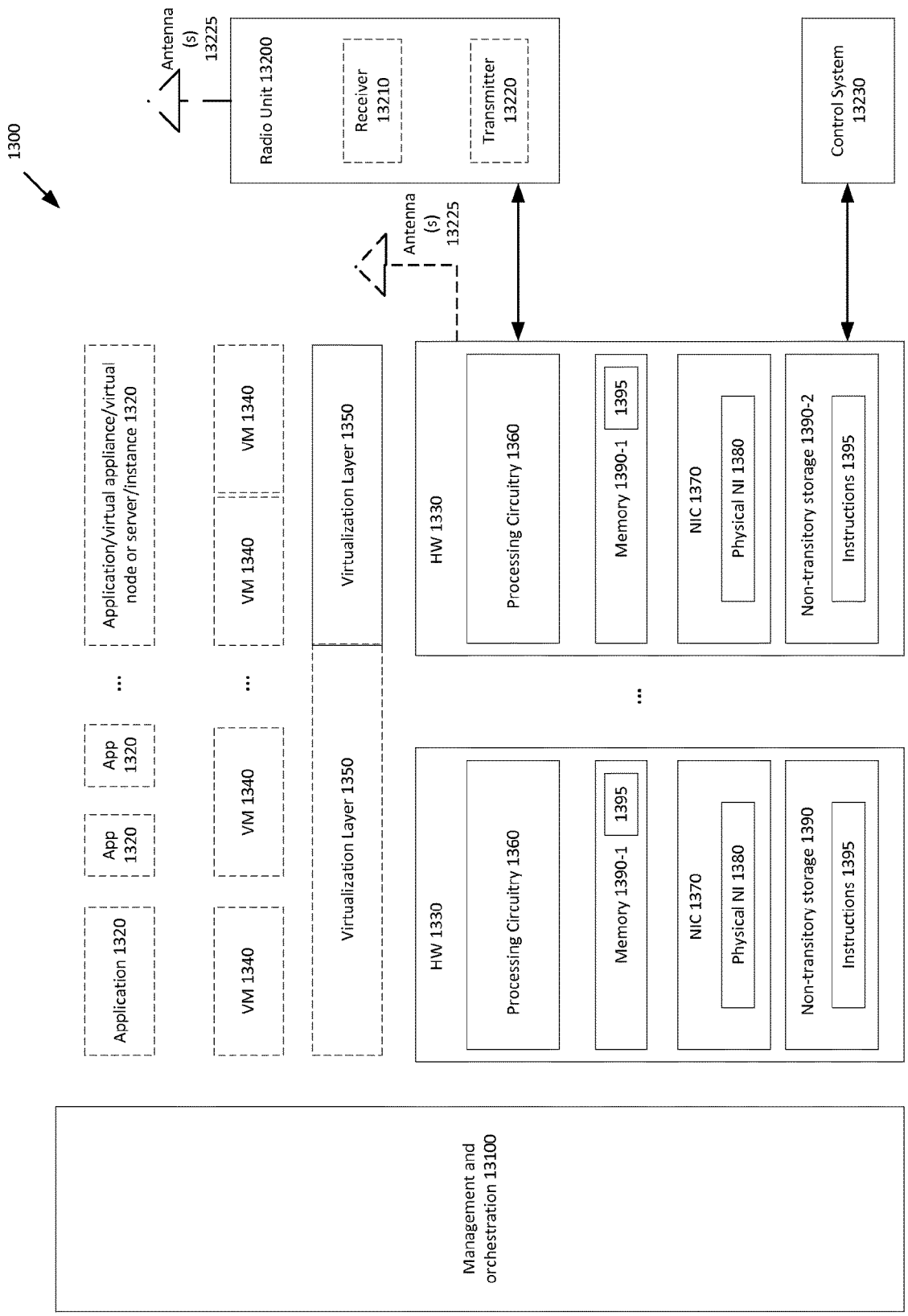
FIG. 13 is a schematic illustration of a virtualisation environment in which functions according to embodiments of the present disclosure may be implemented.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
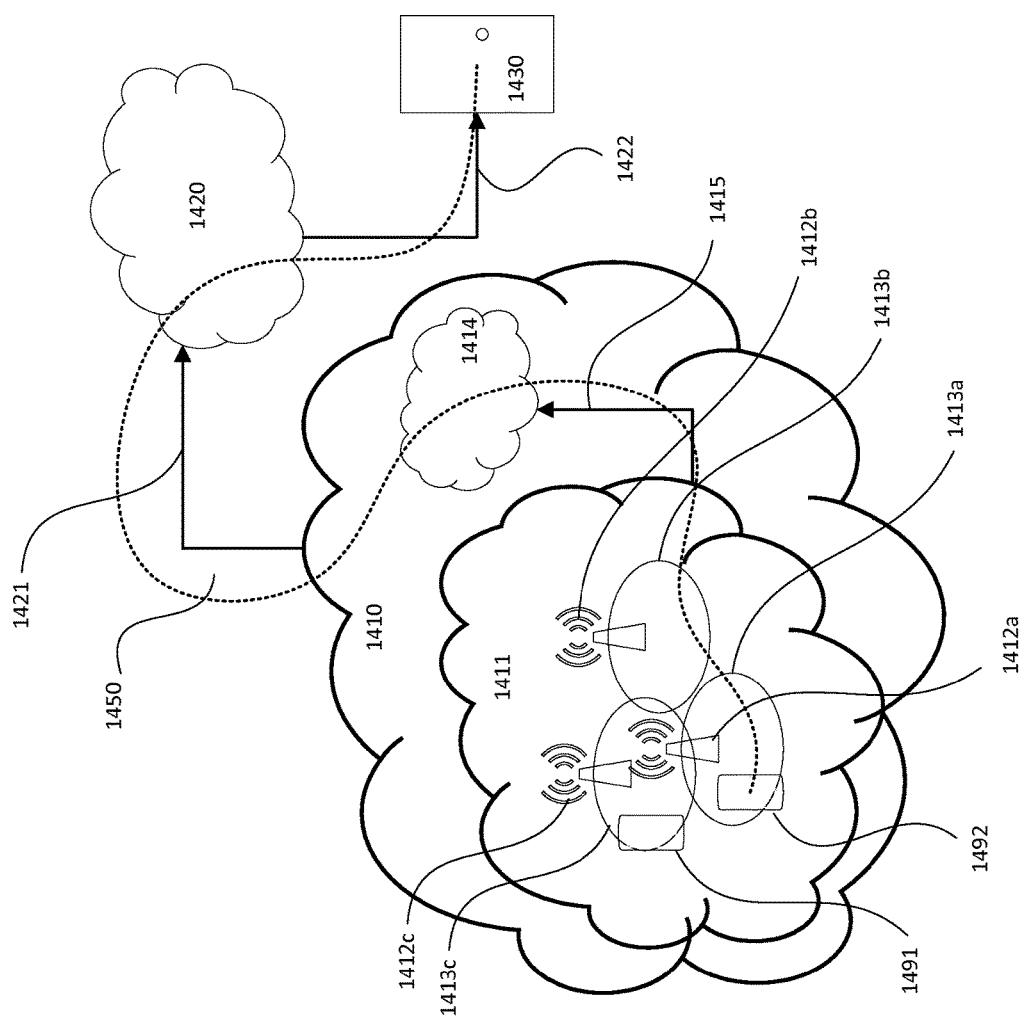
FIG. 14 is a schematic illustration of a telecommunication network connected to a host computer facilitating an over-the-top (OTT) connection.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
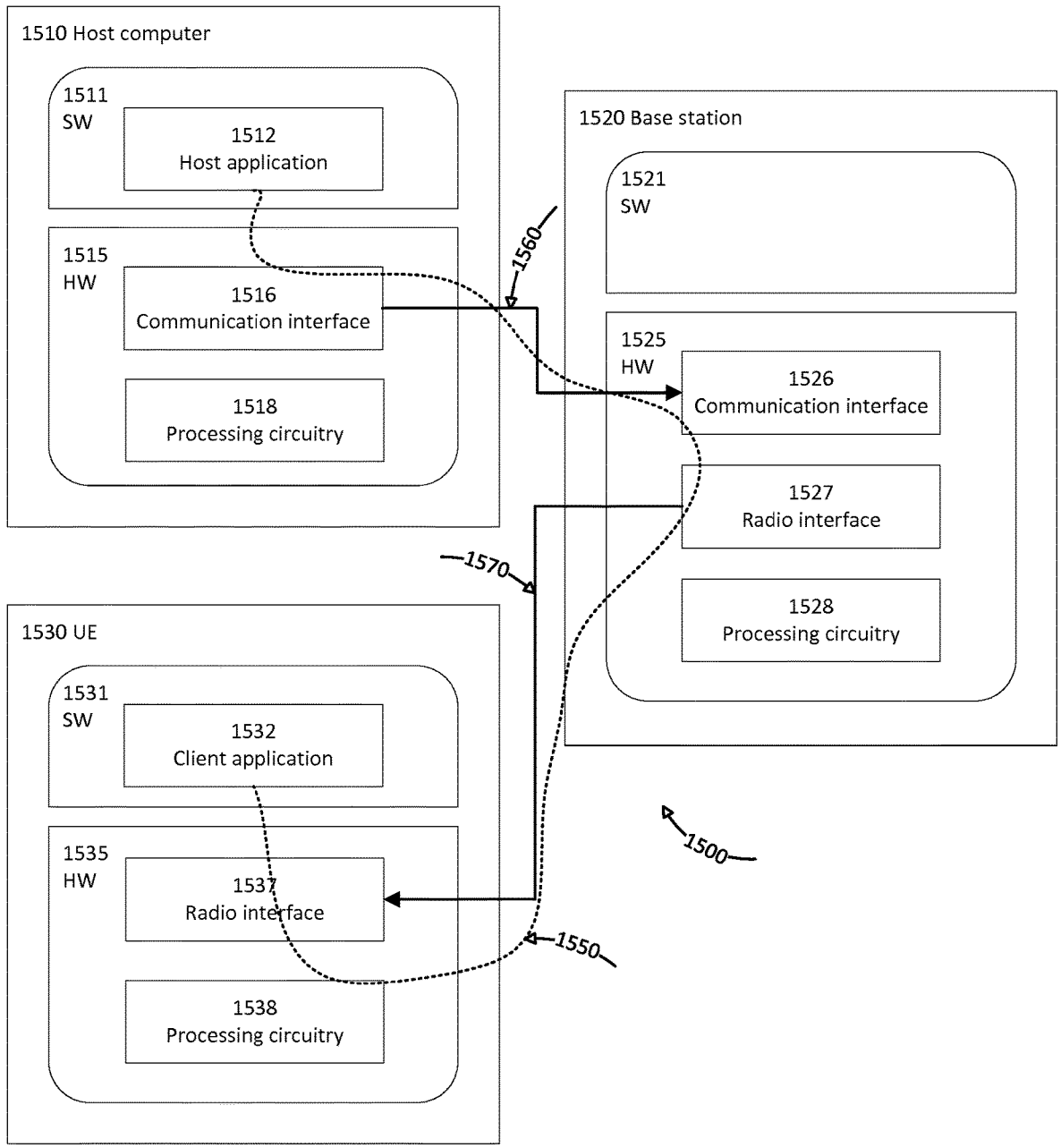
FIG. 15 is a schematic illustration of a host computer communicating with a network node and wireless device according to embodiments of the present disclosure using an OTT connection.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data communications by reducing the time needed for activating secondary cells, and thereby provide benefits such as reduced waiting time and better responsive for user applications. Further, the techniques described herein reduce the processing burden on wireless devices, thus allowing for cost savings, battery life improvements, and/or performance increases in other areas.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities.

The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
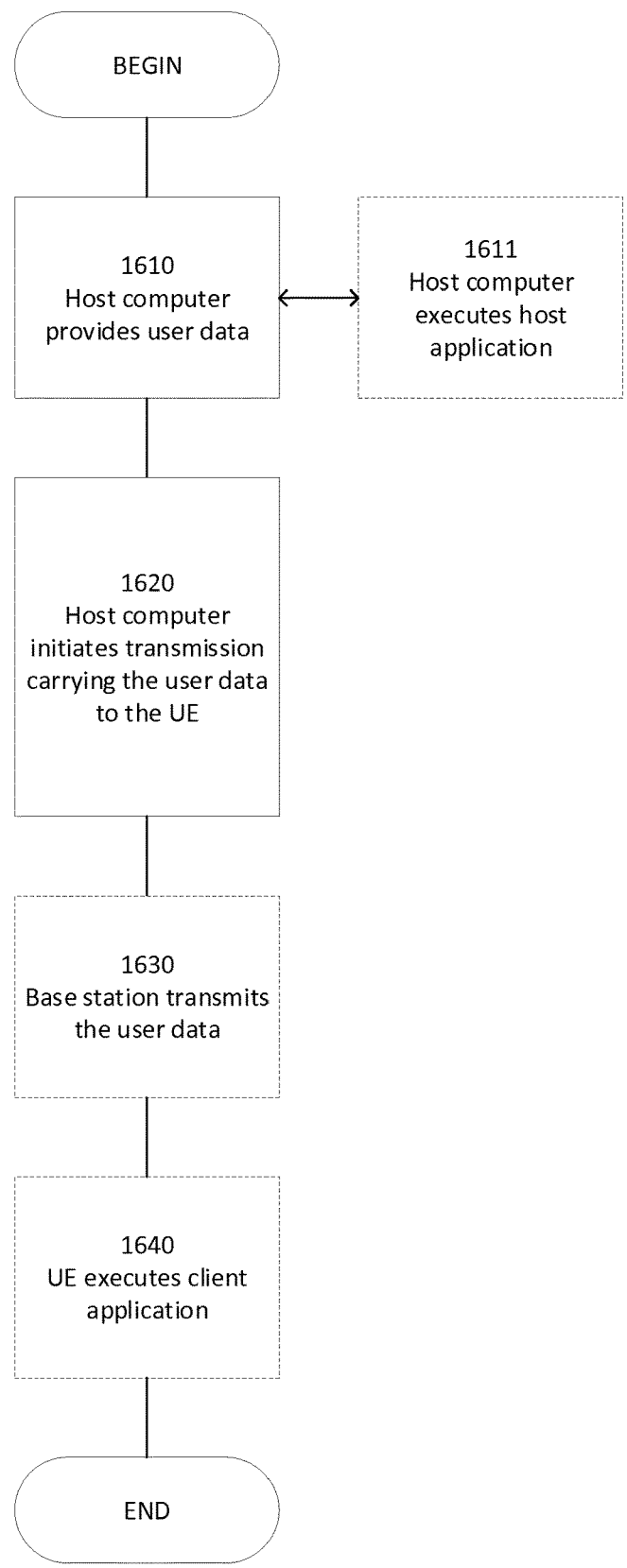
FIG. 16 is a flowchart of steps of an example method performed by a communication system including a host computer, wireless device in the form of a UE and network node in the form of base station, for example the system illustrated in FIG. 14 or 15.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
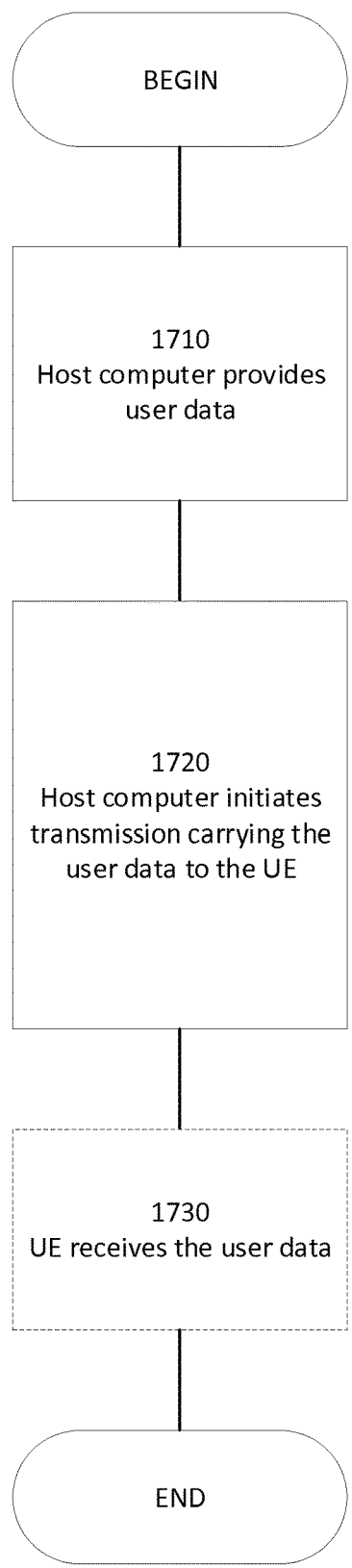
FIG. 17 is a flowchart of steps of a second example method performed by a communication system including a host computer, wireless device in the form of a UE and network node in the form of base station, for example the system illustrated in FIG. 14 or 15.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
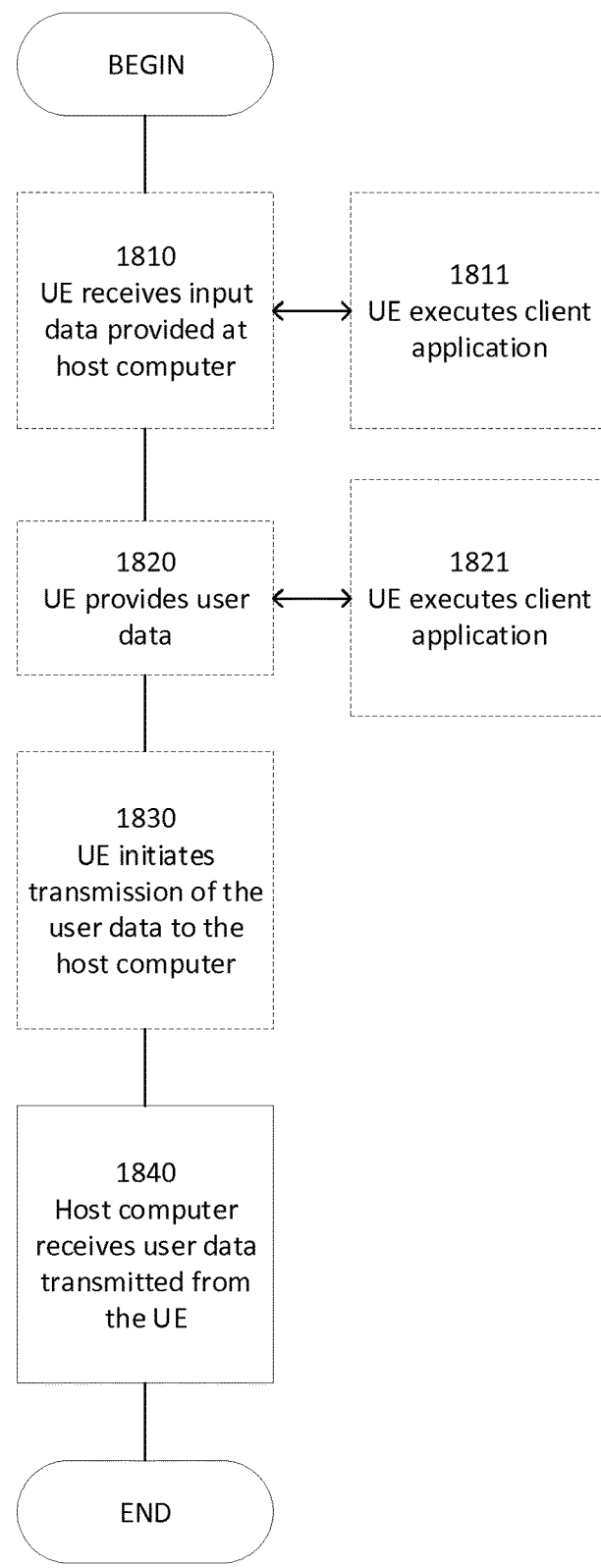
FIG. 18 is a flowchart of steps of a third example method performed by a communication system including a host computer, wireless device in the form of a UE and network node in the form of base station, for example the system illustrated in FIG. 14 or 15.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
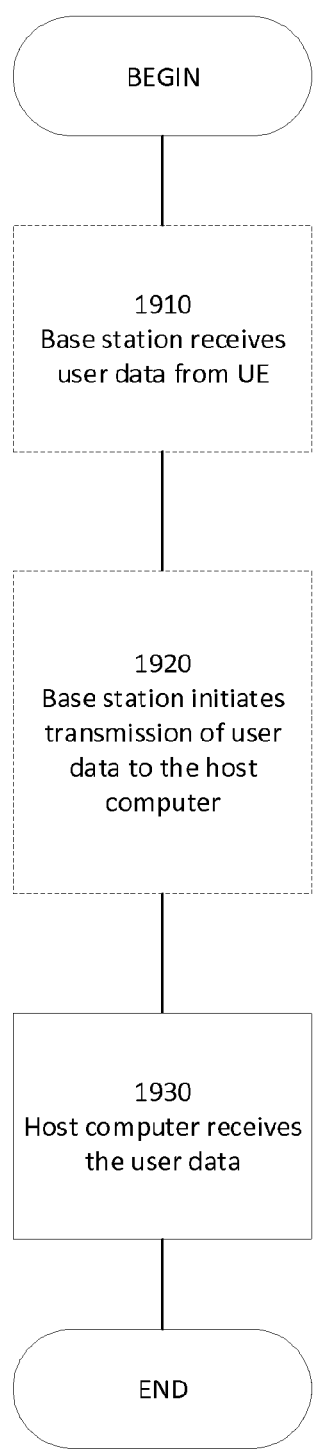
FIG. 19 is a flowchart of steps of a fourth example method implemented in a communication system including a host computer, wireless device in the form of a UE and network node in the form of base station, for example the system illustrated in FIG. 14 or 15.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EXAMPLE EMBODIMENTS

Example embodiments of the presently disclosed techniques and apparatus include, but are not limited to:

Group A Embodiments

1. A method, in a wireless device that supports carrier aggregation (CA), the method comprising: receiving a configuration message, from a wireless network node, indicating that the wireless device is to directly activate two or more secondary cells;
  determining that at least a first one of the two or more secondary cells is to be activated at or by a first time and that at least a second one of the two or more secondary cells is to be activated at or by a second time, following the first time, and
  activating the first one of the secondary cells by the first time and subsequently activating the second one of the secondary cells by the second time.

2. The method of example embodiment 1, wherein said determining comprises:
  determining that the first one of the two or more secondary cells belongs to a first group of one or more secondary cells and that the second one of the two or more secondary cells belongs to a second group of one or more secondary cells; and
  identifying first and second times associated with the first group and the second group, respectively.

3. The method of example embodiment 2, wherein determining that the first one of the two or more secondary cells belongs to the first group of one or more secondary cells and that the second one of the two or more secondary cells belongs to the second group of one or more secondary cells is based on secondary cell indices corresponding to the first one and second one of the two or more secondary cells.

4. The method of example embodiment 2 or 3, wherein determining that the first one of the two or more secondary cells belongs to the first group of one or more secondary cells and that the second one of the two or more secondary cells belongs to the second group of one or more secondary cells is based on a pre-determined grouping of secondary cells.

5. The method of example embodiment 4, wherein the method further comprises receiving, from the wireless network node, configuration information defining the pre-determined grouping of secondary cells.

6. The method of example embodiment 2, wherein determining that the first one of the two or more secondary cells belongs to the first group of one or more secondary cells and that the second one of the two or more secondary cells belongs to the second group of one or more secondary cells is based on grouping information received with or in association with the configuration message.

7. The method of any of example embodiments 1-6, wherein the first time and second time are predefined.

8. The method of any of example embodiments 1-6, wherein the wireless device receives, from the network node, information defining at least the second time.

9. The method of any of example embodiments 1-8, the method further comprising:
  determining that at least a third one of the two or more secondary cells is to be activated at or by a third time, following the first time, and
  activating the third one of the secondary cells by the third time.

AA. The method of any of the previous embodiments, further comprising:
  providing user data; and
  forwarding the user data to a host computer via a transmission to the wireless network node.

Group B Embodiments

10. A method performed by a base station or other network node in a wireless communication network that supports carrier aggregation (CA), the method comprising:
  identifying a group of secondary cells to be directly activated by a wireless device, the group including at least a first one of the secondary cells that is to be directly activated at or by a first time and further including at least a first one of the secondary cells that is to be directly activated at or by a second time, following the first time;

sending a configuration message to the wireless device indicating that the group of secondary cells is to be directly activated by the wireless device; and performing one or more scheduling and/or power control tasks related to the secondary cells, based on knowledge of the first and second times.

11. The method of example embodiment 10, wherein the method further comprises transmitting information indicating that the first one of the secondary cells belongs to a first group, associated with the first time, and that the second one of the secondary cells belongs to a second group, associated with the second time.

12. The method of example embodiment 11, wherein said information is included in the configuration message.

13. The method of example embodiment 12, wherein said information comprises secondary cell indices corresponding to the first one and second one of the two or more secondary cells.

14. The method of example embodiment 11, wherein said information comprises configuration information sent to the wireless device separately from the configuration message.

15. The method of any of example embodiments 10-14, wherein the first time and second time are predefined.

16. The method of any of example embodiments 10-14, the method further comprises sending, to the wireless device, information defining at least the second time.

BB. The method of any of example embodiments 10-16, further comprising:
obtaining user data; and
forwarding the user data to a host computer or a wireless device.

Group C Embodiments

C1. A wireless device configured to perform any of the steps of any of the Group A embodiments.

C2. A wireless device comprising:
processing circuitry configured to perform any of the steps of any of the Group A embodiments; and
power supply circuitry configured to supply power to the wireless device.

C3. A wireless device comprising:
processing circuitry and memory, the memory containing instructions executable by the processing circuitry whereby the wireless device is configured to perform any of the steps of any of the Group A embodiments.

C4. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
processing circuitry configured to perform any of the steps of any of the Group B embodiments;
power supply circuitry configured to supply power to the wireless device.

C9. A base station comprising:
processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
 the processing circuitry of the host computer is configured to execute a host application, thereby providing the user data; and
 the UE's processing circuitry is configured to execute a client application associated with the host application.

D12. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
 communication interface configured to receive user data originating from a transmission from a user equipment (UE) to a base station,
 wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
 the processing circuitry of the host computer is configured to execute a host application; and
 the UE's processing circuitry is configured to execute a client application associated with the host application, thereby providing the user data.

D18. The communication system of the previous 4 embodiments, wherein:
 the processing circuitry of the host computer is configured to execute a host application, thereby providing request data; and
 the UE's processing circuitry is configured to execute a client application associated with the host application, thereby providing the user data in response to the request data.

D19. A method implemented in a communication system including a host computer, a base station and a user equipment (UE), the method comprising:
 at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
 at the UE, executing a client application, thereby providing the user data to be transmitted; and
 at the host computer, executing a host application associated with the client application.

D22. The method of the previous 3 embodiments, further comprising:
 at the UE, executing a client application; and
 at the UE, receiving input data to the client application, the input data being provided at the host computer by executing a host application associated with the client application,
 wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
 the processing circuitry of the host computer is configured to execute a host application;
 the UE is configured to execute a client application associated with the host application, thereby providing the user data to be received by the host computer.

D27. A method implemented in a communication system including a host computer, a base station and a user equipment (UE), the method comprising:
 at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method, in a wireless device that supports carrier aggregation (CA), the method comprising:
 receiving a Radio Resource Control (RRC) configuration message from a wireless network node, the RRC configuration message indicating that the wireless device is to directly activate two or more secondary cells, wherein directly activating a secondary cell refers to configuring and activating the secondary cell to an active or dormant state from an inactive state using a single RRC configuration message;

determining that at least a first one of the two or more secondary cells is to be directly activated by a first time and that at least a second one of the two or more secondary cells is to be directly activated by a second time, following the first time; and directly activating the first one of the secondary cells by the first time and subsequently directly activating the second one of the secondary cells by the second time.

2. The method of claim 1, wherein the method further comprises transmitting a channel state information (CSI) report for the first one of the secondary cells by the first time if that secondary cell can be detected on a first attempt and transmitting a CSI report for the second one of the secondary cells by the second time if that secondary cell can be detected on a first attempt.

3. The method of claim 1, wherein the method further comprises transmitting a CSI report for the first one of the secondary cells on a next available uplink resource after receiving a reference signal for a CSI measurement if no reference signal is received by the first time; and transmitting a CSI report for the second one of the secondary cells on a next available uplink resource after receiving a reference signal for a CSI measurement if no reference signal is received by the second time.

4. The method of any claim 1, wherein the first and second times are determined based on secondary cell indices corresponding to the first one and second one of the two or more secondary cells.

5. The method of claim 1, wherein said determining comprises:

determining that the first one of the two or more secondary cells belongs to a first group of one or more secondary cells and that the second one of the two or more secondary cells belongs to a second group of one or more secondary cells; and identifying first and second times associated with the first group and the second group, respectively.

6. The method of claim 5, wherein determining that the first one of the two or more secondary cells belongs to the first group of one or more secondary cells and that the second one of the two or more secondary cells belongs to the second group of one or more secondary cells is based on secondary cell indices corresponding to the first one and second one of the two or more secondary cells.

7. The method of claim 5, wherein determining that the first one of the two or more secondary cells belongs to the first group of one or more secondary cells and that the second one of the two or more secondary cells belongs to the second group of one or more secondary cells is based on a pre-determined grouping of secondary cells.

8. The method of claim 5, wherein determining that the first one of the two or more secondary cells belongs to the first group of one or more secondary cells and that the second one of the two or more secondary cells belongs to the second group of one or more secondary cells is based on grouping information received with or in association with the configuration message.

9. A method performed by a network node in a wireless communication network that supports carrier aggregation (CA), the method comprising:

identifying a group of secondary cells to be directly activated by a wireless device, the group including at least a first one of the secondary cells that is to be directly activated by a first time and further including at least a second one of the secondary cells that is to be directly activated by a second time, following the first time; and sending a Radio Resource Control (RRC) configuration message to the wireless device indicating that the group of secondary cells is to be directly activated by the wireless device, wherein directly activating a secondary cell refers to configuring and activating the secondary cell to an active or dormant state from an inactive state using a single RRC configuration message.

10. The method of claim 9, wherein the configuration message indicates whether each of the first one and second one of the secondary cells is to be directly activated to an activated state or a dormant state.

11. The method of claim 9, wherein the configuration message indicates secondary cell indices corresponding to the first one and second one of the two or more secondary cells.

12. The method of claim 11, wherein the first and second times are determined based on the secondary cell indices corresponding to the first one and second one of the two or more secondary cells respectively.

13. The method of claim 9, further comprising:

performing one or more scheduling and/or power control tasks related to the secondary cells, based on knowledge of the first and second times.

14. The method of claim 9, wherein the method further comprises transmitting information indicating that the first one of the secondary cells belongs to a first group, associated with the first time, and that the second one of the secondary cells belongs to a second group, associated with the second time.

15. The method of claim 14, wherein said information is included in the configuration message.

16. The method of claim 15, wherein said information comprises secondary cell indices corresponding to the first one and second one of the two or more secondary cells.

17. The method of claim 14, wherein said information comprises configuration information sent to the wireless device separately from the configuration message.

18. A wireless device comprising:

processing circuitry and memory, the memory containing instructions executable by the processing circuitry whereby the wireless device is configured to:

receive a Radio Resource Control (RRC) configuration message from a wireless network node, the RRC configuration message indicating that the wireless device is to directly activate two or more secondary cells, wherein directly activating a secondary cell refers to configuring and activating the secondary cell to an active or dormant state from an inactive state using a single RRC configuration message;

determine that at least a first one of the two or more secondary cells is to be directly activated by a first time and that at least a second one of the two or more secondary cells is to be directly activated by a second time, following the first time, and directly activate the first one of the secondary cells by the first time and subsequently directly activate the second one of the secondary cells by the second time.

19. A non-transitory computer-readable storage medium having stored thereon a computer program comprising instructions that, when executed by a processor of a wireless device, cause the wireless device to perform a method comprising:

receiving a Radio Resource Control (RRC) configuration message from a wireless network node, the RRC configuration message indicating that the wireless device is to directly activate two or more secondary cells, wherein directly activating a secondary cell refers to configuring and activating the secondary cell to an active or dormant state from an inactive state using a single RRC configuration message;

determining that at least a first one of the two or more secondary cells is to be directly activated by a first time and that at least a second one of the two or more secondary cells is to be directly activated by a second time, following the first time, and directly activating the first one of the secondary cells by the first time and subsequently directly activating the second one of the secondary cells by the second time.

* * * * *